United States Patent
Olivieri et al.

(10) Patent No.: US 12,308,034 B2
(45) Date of Patent: May 20, 2025

(54) PERFORMING PSYCHOACOUSTIC AUDIO CODING BASED ON OPERATING CONDITIONS

(71) Applicant: QUALCOMM Incorporated, San Diego, CA (US)

(72) Inventors: Ferdinando Olivieri, San Diego, CA (US); Taher Shahbazi Mirzahasanloo, San Diego, CA (US); Nils Günther Peters, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 733 days.

(21) Appl. No.: 16/907,771

(22) Filed: Jun. 22, 2020

(65) Prior Publication Data

US 2020/0402521 A1 Dec. 24, 2020

Related U.S. Application Data

(60) Provisional application No. 62/865,848, filed on Jun. 24, 2019.

(51) Int. Cl.
*G10L 19/008* (2013.01)
*G10L 19/032* (2013.01)
(Continued)

(52) U.S. Cl.
CPC .......... *G10L 19/008* (2013.01); *G10L 19/032* (2013.01); *G10L 25/48* (2013.01); *H04L 65/75* (2022.05); *H04L 65/752* (2022.05)

(58) Field of Classification Search
None
See application file for complete search history.

(56) References Cited

U.S. PATENT DOCUMENTS 5,651,090 A 7/1997 Moriya et al.
9,626,973 B2 * 4/2017 Taleb .................... G10L 19/008
(Continued)

FOREIGN PATENT DOCUMENTS

CN 102089808 A 6/2011
CN 102124517 A 7/2011
(Continued)

OTHER PUBLICATIONS

International Preliminary Report on Patentability—PCT/US2020/039158, The International Bureau of WIPO—Geneva, Switzerland, Jan. 6, 2022 8 Pages.
(Continued)

*Primary Examiner* — Daniel C Washburn
*Assistant Examiner* — Paul J. Mueller
(74) *Attorney, Agent, or Firm* — QUALCOMM Incorporated; Espartaco Diaz Hidalgo

(57) ABSTRACT

A device comprising a memory and one or more processors may be configured to perform the techniques described in this disclosure. The memory may be configured to store the encoded scene-based audio data. The one or more processors may be configured to obtain an operating condition of the device for decoding the encoded scene-based audio data and perform, based on the operating condition, psychoacoustic audio decoding with respect to the encoded scene-based audio data to obtain ambisonic transport format audio data. The one or more processors may also be configured to perform spatial audio decoding with respect to the ambisonic transport format audio data to obtain scene-based audio data.

29 Claims, 17 Drawing Sheets

(51) Int. Cl.
  *G10L 25/48* (2013.01)
  *H04L 65/75* (2022.01)
  *H04L 65/752* (2022.01)

(56) References Cited

U.S. PATENT DOCUMENTS

| | | | |
|---|---|---|---|
| 9,747,910 B2* | 8/2017 | Kim | H04S 3/008 |
| 9,852,737 B2 | 12/2017 | Kim et al. | |
| 9,959,880 B2 | 5/2018 | Peters et al. | |
| 10,075,802 B1 | 9/2018 | Kim et al. | |
| 10,657,974 B2 | 5/2020 | Kim et al. | |
| 10,770,087 B2 | 9/2020 | Kim et al. | |
| 2003/0006916 A1 | 1/2003 | Takamizawa | |
| 2007/0168197 A1 | 7/2007 | Vasilache | |
| 2007/0269063 A1 | 11/2007 | Goodwin et al. | |
| 2007/0286441 A1* | 12/2007 | Harsch | H04R 25/30 381/315 |
| 2008/0027709 A1 | 1/2008 | Baumgarte | |
| 2008/0136686 A1 | 6/2008 | Feiten | |
| 2008/0252510 A1 | 10/2008 | Jung et al. | |
| 2010/0017204 A1 | 1/2010 | Oshikiri et al. | |
| 2011/0170711 A1 | 7/2011 | Rettelbach et al. | |
| 2011/0249821 A1 | 10/2011 | Jaillet et al. | |
| 2012/0042107 A1* | 2/2012 | Rabii | H04M 1/6016 713/323 |
| 2013/0275140 A1 | 10/2013 | Kim et al. | |
| 2014/0219459 A1 | 8/2014 | Daniel et al. | |
| 2014/0249827 A1* | 9/2014 | Sen | G10L 19/167 704/500 |
| 2014/0358557 A1 | 12/2014 | Sen et al. | |
| 2014/0358565 A1 | 12/2014 | Peters et al. | |
| 2015/0025895 A1 | 1/2015 | Schildbach | |
| 2015/0255076 A1 | 9/2015 | Fejzo | |
| 2015/0271621 A1 | 9/2015 | Sen et al. | |
| 2015/0332681 A1 | 11/2015 | Kim et al. | |
| 2015/0340044 A1 | 11/2015 | Kim | |
| 2015/0358810 A1* | 12/2015 | Chao | H04W 4/50 455/418 |
| 2016/0005407 A1 | 1/2016 | Friedrich et al. | |
| 2016/0007132 A1* | 1/2016 | Peters | H04S 5/00 381/17 |
| 2016/0064005 A1* | 3/2016 | Peters | H04H 60/07 381/23 |
| 2016/0093311 A1 | 3/2016 | Kim et al. | |
| 2016/0104493 A1 | 4/2016 | Kim et al. | |
| 2016/0104494 A1* | 4/2016 | Kim | G10L 19/167 381/23 |
| 2018/0013446 A1* | 1/2018 | Milicevic | H03M 13/1174 |
| 2018/0082694 A1 | 3/2018 | Kim | |
| 2018/0278962 A1* | 9/2018 | Johnston | H04N 19/625 |
| 2019/0007781 A1 | 1/2019 | Peters et al. | |
| 2019/0103118 A1 | 4/2019 | Atti et al. | |
| 2019/0259398 A1 | 8/2019 | Buethe et al. | |
| 2019/0371348 A1* | 12/2019 | Shahbazi Mirzahasanloo | H04W 84/12 |
| 2020/0013414 A1 | 1/2020 | Thagadur Shivappa et al. | |
| 2020/0402519 A1 | 12/2020 | Olivieri | |

FOREIGN PATENT DOCUMENTS

| | | |
|---|---|---|
| CN | 104285451 A | 1/2015 |
| CN | 104471641 A | 3/2015 |
| CN | 105593931 A | 5/2016 |
| EP | 3067885 A1 | 9/2016 |
| WO | 2015000819 A1 | 1/2015 |
| WO | 2015176003 A1 | 11/2015 |
| WO | 2017066312 A1 | 4/2017 |

OTHER PUBLICATIONS

Final Office Action from U.S. Appl. No. 116/907,934 mailed Jan. 28, 2022, 17 pages.

Notice of Allowance from U.S. Appl. No. 16/907,969, mailed Feb. 16, 2022, 12 pp.

Peters N., et al., "Scene-Based Audio Implemented with Higher Order Ambisonics (HOA)", SMPTE Motion Imaging Journal, Nov.-Dec. 2016, 13 pages.

Shankar Shivappa, et al., "Efficient, Compelling and Immersive VR Audio Experience Using Scene Based Audo/Higher Order Ambisonics", AES conference paper, presented on the conference on Audio for Virtual and Augmented Reality, Los Angeles, CA, USA, p. 1-10, Sep. 30-Oct. 1, 2016.

Advisory Action for U.S. Appl. No. 16/907,934, mailed Apr. 5, 2022, 4 pp.

Appeal Brief for U.S. Appl. No. 16/907,934, filed Jun. 21, 2022, 27 pp.

Ma N., et al., "Combining Speech Fragment Decoding and Adaptive Noise Floor Modeling", in IEEE Transactions on Audio, Speech, and Language Processing, vol. 20, No. 3, pp. 818-827, Mar. 2012.

Non-Final Office Action for U.S. Appl. No. 16/908,032, mailed May 18, 2022, 41 pp.

Zamani S., et al., "Spatial Audio Coding without Recourse to Background Signal Compression", ICASSP 2019—2019 IEEE International Conference on Acoustics, Speech and Signal Processing (ICASSP), 2019, pp. 720-724, DOI: 10.1109/ICASSP.2019.8682315. (Year: 2019).

"3rd Generation Partnership Project; Technical Specification Group Services and System Aspects; Virtual Reality (VR) Media Services Over 3GPP (Release 15)",3GPP Draft, S4-170494 TR 26.918 Virtual Reality (VR) Media Services Over 3GPPV0.7.0 Clean, 3rd Generation Partnership Project (3GPP), Mobile Competence Centre, 650, Route Des Lucioles, F-06921 Sophi, Apr. 28, 2017 (Apr. 28, 2017), XP051269716, pp. 1-58, Retrieved from the Internet: URL: http://www.3gpp.org/ftp/tsg_sa/WG4_CODEC/TSGS4_93/Docs/ [retrieved on Apr. 28, 2017] Section 4.3.3.2, Example 4.19.

"Advanced Audio Distribution Profile Specification," version 1.3.1, published Jul. 14, 2015, 35 pp.

AUDIO: "Call for Proposals for 3D Audio", International Organisation for Standardisation Organisation Internationale De Normalisation ISO/IEC JTC1/SC29/WG11 Coding of Moving Pictures and Audio, ISO/IEC JTC1/SC29/WG11/N13411, Geneva, Jan. 2013, pp. 1-20.

"Bluetooth Core Specification v 5.0," published Dec. 6, 2016 accessed from https://www.bluetooth.com/specifications, pp. 1-5.

Boehm J., et al., "Scalable Decoding Mode for MPEG-H 3D Audio HOA", 108. MPEG Meeting; Mar. 31, 2014-Apr. 4, 2014; Valencia; (Motion Picture Expert Group or ISO/IEC JTC1/SC29/WG11), No. m33195, Mar. 26, 2014 (Mar. 26, 2014), 12 Pages, XP030061647 [A] 16-18 * p. 1, section 1, paragraph 3 *, p. 2, line 21—p. 6, line 30, Retrieved from the Internet: URL: http://phenix.int-evry.fr/mpeg/doc_enduser/documents/108_Valencia/wg11/m33195-v1-m33195_ScalableHOA.docx.zip m33195_ScalableHOA.docx [retrieved on May 5, 2014] Section 1, Section 2.1.1, Section 2.2, Section 2.2.1, Section 2.4.2, Section 2.4.4. figures 2(b), 3.

ETSI TS 103 589 V1.1.1, "Higher Order Ambisonics (HOA) Transport Format", Jun. 2018, 33 pages.

Herre J., et al., "MPEG-H 3D Audio—The New Standard for Coding of Immersive Spatial Audio", IEEE Journal of Selected Topics in Signal Processing, vol. 9, No. 5, Aug. 1, 2015 (Aug. 1, 2015), pp. 770-779, XP055243182, US ISSN: 1932-4553, DOI: 10.1109/JSTSP.2015.2411578.

Hollerweger F., "An Introduction to Higher Order Ambisonic," Oct. 2008, pp. 13, Accessed online [Jul. 8, 2013].

"Information technology—High Efficiency Coding and Media Delivery in Heterogeneous Environments—Part 3: 3D Audio," ISO/IEC JTC 1/SC 29, ISO/IEC DIS 23008-3, Jul. 25, 2014, 433 Pages.

"Information technology—High Efficiency Coding and Media Delivery in Heterogeneous Environments—Part 3: 3D Audio", ISO/IEC JTC 1/SC 29/WG11, ISO/IEC 23008-3, 201x(E), Oct. 12, 2016, 797 Pages.

"Information technology—High efficiency coding and media delivery in heterogeneous environments—Part 3: Part 3: BD Audio, Amendment 3: MPEG-H 3D Audio Phase 2," ISO/IEC JTC 1/SC 29N, ISO/IEC 23008-3:2015/PDAM 3, Jul. 25, 2015, 208 pp.

(56) References Cited

OTHER PUBLICATIONS

International Search Report and Written Opinion—PCT/US2020/039158—ISA/EPO—Oct. 9, 2020.
ISO/IEC/JTC: "ISO/IEC JTC 1/SC 29 N ISO/IEC CD 23008-3 Information technology—High efficiency coding and media delivery in heterogeneous environments—Part 3: 3D audio," Apr. 4, 2014 (Apr. 4, 2014), 337 Pages, XP055206371, Retrieved from the Internet: URL:http://www.iso.org/iso/iso_catalogue/catalogue_tc/catalogue_to_browse.htm?commid=45316 [retrieved on Aug. 5, 2015].
Poletti M.A., "Three-Dimensional Surround Sound Systems Based on Spherical Harmonics", The Journal of the Audio Engineering Society, vol. 53, No. 11, Nov. 2005, pp. 1004-1025.
Schonefeld V., "Spherical Harmonics", Jul. 1, 2005, XP002599101, 25 Pages, Accessed online [Jul. 9, 2013] at URL:http://heim.c-otto.de/~volker/prosem_paper.pdf.
Sen D., et al., "Efficient Compression and Transportation of Scene Based Audio for Television Broadcast", Jul. 18, 2016 (Jul. 18, 2016), XP055327771, 8 pages, Retrieved from the Internet: URL: http://www.aes.org/tmpFiles/elib/20161209/18329.pdf. [retrieved on Dec. 9, 2016] paragraphs [0002], [0003]; figures 3,4.
Sen D., et al., "RM1-HOA Working Draft Text", 107. MPEG Meeting, Jan. 13, 2014-Jan. 17, 2014, San Jose, (Motion Picture Expert Group or ISO/IEC JTC1/SC29/WG11), No. m31827, Jan. 11, 2014 (Jan. 11, 2014), 83 Pages, XP030060280, p. 11, paragraph 5.2.4—paragraph 5.2.5 p. 16, paragraph 6.1.10—p. 17; Figure 4 p. 18, paragraph 6.3—p. 22, Paragraph 6.3.2.2 p. 64, paragraph B.1—p. 66, Paragraph B.2.1; figures B.1, B.2 p. 70, paragraph B.2.1.3—p. 71 p. 74, paragraph B.2.4.1—p. 75, Paragraph B.2.4.2.
Sen D., et al., "Technical Description of the Qualcomm's HoA Coding Technology for Phase II", 109. MPEG Meeting; Jul. 7, 2014-Jul. 11, 2014; Sapporo; (Motion Picture Expert Group or ISO/IEC JTC1/SC29/WG11), No. m34104, Jul. 2, 2014 (Jul. 2, 2014), 4 Pages, XP030062477, figure 1.
Sen D (Qualcomm)., et al., "Thoughts on Layered/Scalable Coding for HOA the Signal", 110. MPEG Meeting, Oct. 20, 2014-Oct. 24, 2014; Strasbourg, (Motion Picture Expert Group or ISO/IEC JTC1/SC29/WG11), No. m35160, Oct. 15, 2014 (Oct. 15, 2014), XP030063532, 5 Pages, figure 1, Retrieved from the Internet: URL: http://phenix.int-evry.fr/mpeg/doc_enduser/documents/110_Strasbourg/wg11/m35160-v1-m35160.zip m35160.docx [retrieved on Oct. 15, 2014] The Whole Document.
Yang D., "High Fidelity Multichannel Audio Compression", Jan. 1, 2002 (Jan. 1, 2002), 211 Pages, XP055139610. Retrieved from the Internet: URL: http://search.proquest.com/docview/305523844. section 5.1.
U.S. Appl. No. 16/907,934, filed Jun. 22, 2020, 65 Pages.
U.S. Appl. No. 16/907,969, filed Jun. 22, 2020, 73 Pages.
U.S. Appl. No. 16/908,032, filed Jun. 22, 2020, 74 Pages.
Patent Board Decision for U.S. Appl. No. 16/907,934, mailed Dec. 11, 2023, 10 pp.
Response to Decision on Appeal dated Dec. 11, 2023 from U.S. Appl. No. 16/907,934, filed Feb. 2, 2024, 10 pp.
Notice of Allowance from U.S. Appl. No. 16/907,934 dated Mar. 1, 2024, 12 pp.

\* cited by examiner

PERFORMING PSYCHOACOUSTIC AUDIO CODING BASED ON OPERATING CONDITIONS

This application claims the benefit of U.S. Provisional Application No. 62/865,848, entitled "PERFORMING PSYCHOACOUSTIC AUDIO CODING BASED ON OPERATING CONDITIONS," filed Jun. 24, 2019, the entire contents of which are hereby incorporated by reference as if set out in its entirety herein.

TECHNICAL FIELD

This disclosure relates to audio data and, more specifically, coding of audio data.

BACKGROUND

Psychoacoustic audio coding refers to a process whereby audio data is compressed using psychoacoustic models. The psychoacoustic audio coding may leverage limitations in a human auditory system to compress the audio data, taking into account limitations that occur due to spatial masking (e.g., two audio sources at the same location where one of the auditory sources masks, in terms of loudness, another auditory source), temporal masking (e.g., where one audio source masks, in terms of loudness, another auditory source), etc. The psychoacoustic models may attempt to model the human auditory system to identify masked or other portions of the soundfield that are redundant, masked, or otherwise incapable of being perceived by the human auditory system. The psychoacoustic audio coding may also perform lossless compression by entropy encoding the audio data.

SUMMARY

In general, techniques are described for performing psychoacoustic audio coding based on operating condition.

In one example, various aspects of the techniques are directed to a device configured to decode encoded scene-based audio data, the device comprising: a memory configured to store the encoded scene-based audio data; one or more processors configured to: obtain an operating condition of the device for decoding the encoded scene-based audio data; perform, based on the operating condition, psychoacoustic audio decoding with respect to the encoded scene-based audio data to obtain ambisonic transport format audio data; and perform spatial audio decoding with respect to the ambisonic transport format audio data to obtain scene-based audio data.

In another example, various aspects of the techniques are directed to a method of decoding encoded scene-based audio data, the method comprising: obtaining an operating condition of a device configured to decode the encoded scene-based audio data; performing, based on the operating condition, psychoacoustic audio decoding with respect to the encoded scene-based audio data to obtain ambisonic transport format audio data; and performing spatial audio decoding with respect to the ambisonic transport format audio data to obtain scene-based audio data.

In another example, various aspects of the techniques are directed to a device configured to decode encoded scene-based audio data, the device comprising: means for obtaining an operating condition of a device configured to decode the encoded scene-based audio data; means for performing, based on the operating condition, psychoacoustic audio decoding with respect to the encoded scene-based audio data to obtain ambisonic transport format audio data; and means for performing spatial audio decoding with respect to the ambisonic transport format audio data to obtain scene-based audio data.

In another example, various aspects of the techniques are directed to a non-transitory computer-readable storage medium having stored thereon instructions that, when executed, cause one or more processors to: obtain an operating condition of the device configured to decode encoded scene-based audio data; perform, based on the operating condition, psychoacoustic audio decoding with respect to the encoded scene-based audio data to obtain ambisonic transport format audio data; and perform spatial audio decoding with respect to the ambisonic transport format audio data to obtain scene-based audio data.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
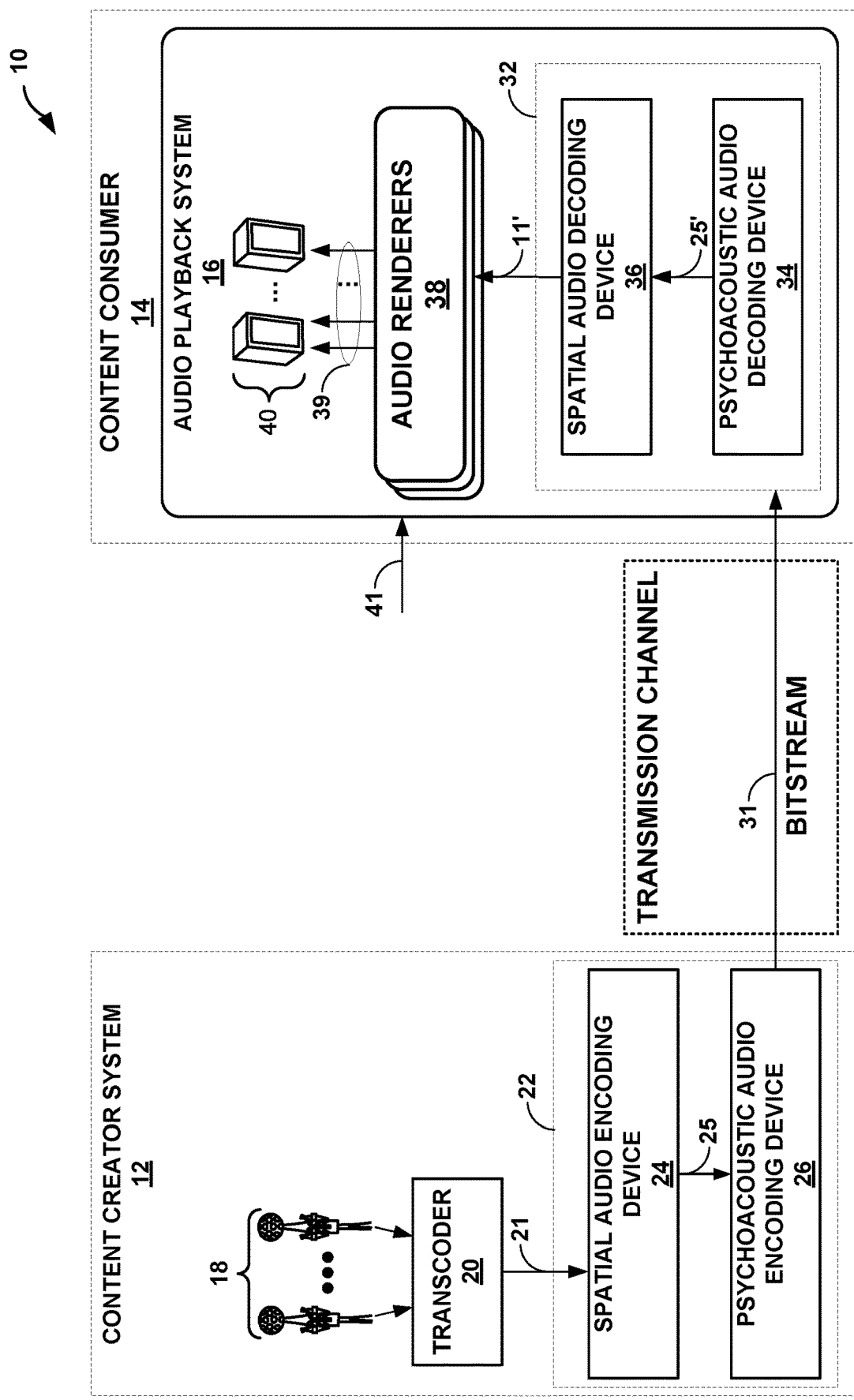
FIG. 1 is a diagram illustrating a system that may perform various aspects of the techniques described in this disclosure.

Different types of audio formats exist including channel-based, object-based, and scene-based. Scene-based formats may use ambisonic technology. ambisonic technology allows for soundfields to be represented using a hierarchical set of elements that can be rendered to speaker feeds for most speaker configurations.

One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions (e.g., pulse code modulated—PCM—audio objects, which include the audio object and metadata defining a location of the audio object within a soundfield) of the soundfield. The SHC (which also may be referred to as ambisonic coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the soundfield corresponding to an individual audio object may be expressed as:

$$A_n^m(k) = g(\omega)(-4\pi i k) h_n^{(2)}(kr_s) Y_n^{m*}(\theta_s, \varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the PCM stream) allows us to convert each PCM object and the corresponding location into the SHC $A_n^m(k)$. Further, it can be shown (since the above is a linear and orthogonal decomposition) that the $A_n^m(k)$ coefficients for each object are additive. In this manner, a number of PCM objects (where a PCM object is one example of the audio objects) can be represented by the $A_n^m(k)$ coefficients (e.g., as a sum of the coefficient vectors for the individual objects). Essentially, the coefficients contain information about the soundfield (the pressure as a function of 3D coordinates), and the above represents the transformation from individual objects to a representation of the overall soundfield, in the vicinity of the observation point $\{r_r, \theta_r, \varphi_r\}$. The following figures are described below in the context of SHC-based audio coding.

FIG. 1 is a diagram illustrating a system 10 that may perform various aspects of the techniques described in this disclosure. As shown in the example of FIG. 1, the system 10 includes a content creator system 12 and a content consumer 14. While described in the context of the content creator system 12 and the content consumer 14, the techniques may be implemented in any context in which SHCs (which may also be referred to as ambisonic coefficients) or any other hierarchical representation of a soundfield are encoded to form a bitstream representative of the audio data.

Moreover, the content creator system 12 may represent a system comprising one or more of any form of computing devices capable of implementing the techniques described in this disclosure, including a handset (or cellular phone, including a so-called "smartphone," or, in other words, mobile phone or handset), a tablet computer, a laptop computer, a desktop computer, an extended reality (XR) device (which may refer to any one or more of virtual reality—VR—devices, augmented reality—AR—devices, mixed reality—MR—devices, etc.), a gaming system, an optical disc player, a receiver (such as an audio/visual—A/V—receiver), or dedicated hardware to provide a few examples.

Likewise, the content consumer 14 may represent any form of computing device capable of implementing the techniques described in this disclosure, including a handset (or cellular phone, including a so-called "smartphone," or in other words, a mobile handset or phone), an XR device, a tablet computer, a television (including so-called "smart televisions"), a set-top box, a laptop computer, a gaming system or console, a watch (including a so-called smart watch), wireless headphones (including so-called "smart headphones"), or a desktop computer to provide a few examples.

The content creator system 12 may represent any entity that may generate audio content and possibly video content for consumption by content consumers, such as the content consumer 14. The content creator system 12 may capture live audio data at events, such as sporting events, while also inserting various other types of additional audio data, such as commentary audio data, commercial audio data, intro or exit audio data and the like, into the live audio content.

The content consumer 14 represents an individual that owns or has access to an audio playback system 16, which may refer to any form of audio playback system capable of rendering higher order ambisonic audio data (which includes higher order audio coefficients that, again, may also be referred to as spherical harmonic coefficients) to speaker feeds for play back as audio content. In the example of FIG. 1, the content consumer 14 includes the audio playback system 16.

The ambisonic audio data may be defined in the spherical harmonic domain and rendered or otherwise transformed from the spherical harmonic domain to a spatial domain, resulting in the audio content in the form of one or more speaker feeds. The ambisonic audio data may represent one example of "scene-based audio data," which describes an audio scene using ambisonic coefficients. Scene-based audio data is distinguished from object-based audio data in that an entire scene is described (in the spherical harmonic domain) as opposed to discreet objects (in the spatial domain) as is common in object-based audio data. Scene-based audio data is different than channel-based audio data in that the scene-based audio data resides in the spherical harmonic domain as opposed to the spatial domain of channel-based audio data.

In any event, the content creator system 12 includes microphones 18 that record or otherwise obtain live recordings in various formats (including directly as ambisonic coefficients and audio objects). When the microphone array 18 (which may also be referred to as "microphones 18") obtains live audio directly as ambisonic coefficients, the microphones 18 may include a transcoder, such as an transcoder 20 shown in the example of FIG. 1.

In other words, although shown as separate from the microphones 18, a separate instance of the ambisonic Transcoder 20 may be included within each of the microphones 18 so as to transcode the captured feeds into the ambisonic coefficients 21. However, when not included within the microphones 18, the ambisonic Transcoder 20 may transcode the live feeds output from the microphones 18 into the ambisonic coefficients 21. In this respect, the ambisonic Transcoder 20 may represent a unit configured to transcode microphone feeds and/or audio objects into the ambisonic coefficients 21. The content creator system 12 therefore includes the ambisonic transcoder 20 as integrated with the microphones 18, as a transcoder separate from the microphones 18 or some combination thereof.

The content creator system 12 may also include an audio encoder 22 configured to compress the ambisonic coefficients 21 to obtain a bitstream 31. The audio encoder 22 may include a spatial audio encoding device 24 and a psychoacoustic audio encoding device 26. The spatial audio encoding device 24 may represent a device capable of performing the compression with respect to the ambisonic coefficients 21 to obtain intermediately formatted audio data 25 (which may also be referred to as "mezzanine formatted audio data 25" when the content creator system 12 represents a broadcast network as described in more detail below). Intermediately formatted audio data 25 may represent audio data that is compressed using spatial audio compression but that has not yet undergone psychoacoustic audio encoding (e.g., such as AptX or advanced audio coding—AAC, or other similar types of psychoacoustic audio encoding, including various enhanced AAC—eAAC—such as high efficiency AAC—HE-AAC—HE-AAC v2, which is also known as eAAC+, etc.).

The spatial audio encoding device 24 may be configured to compress the ambisonic coefficients 21. That is, the spatial audio encoding device 24 may compress the ambisonic coefficients 21 using a decomposition involving application of a linear invertible transform (LIT). One example of the linear invertible transform is referred to as a "singular value decomposition" ("SVD"), a principal component analysis ("PCA"), or an Eigenvalue decomposition, which may represent different examples of a linear invertible decomposition.

In this example, the spatial audio encoding device 24 may apply SVD to the ambisonic coefficients 21 to determine a decomposed version of the ambisonic coefficients 21. The decomposed version of the ambisonic coefficients 21 may include one or more of predominant audio signals and one or more corresponding spatial components describing spatial characteristics, e.g., a direction, shape, and width, of the associated predominant audio signals. As such, the spatial audio encoding device 24 may apply the decomposition to the ambisonic coefficients 21 to decouple energy (as represented by the predominant audio signals) from the spatial characteristics (as represented by the spatial components).

The spatial audio encoding device 24 may analyze the decomposed version of the ambisonic coefficients 21 to identify various parameters, which may facilitate reordering of the decomposed version of the ambisonic coefficients 21. The spatial audio encoding device 24 may reorder the decomposed version of the ambisonic coefficients 21 based on the identified parameters, where such reordering may improve coding efficiency given that the transformation may reorder the ambisonic coefficients across frames of the ambisonic coefficients (where a frame commonly includes M samples of the decomposed version of the ambisonic coefficients 21 and M is, in some examples, set to 1024).

After reordering the decomposed version of the ambisonic coefficients 21, the spatial audio encoding device 24 may select one or more of the decomposed versions of the ambisonic coefficients 21 as representative of foreground (or, in other words, distinct, predominant or salient) components of the soundfield. The spatial audio encoding device 24 may specify the decomposed version of the ambisonic coefficients 21 representative of the foreground components (which may also be referred to as a "predominant sound signal," a "predominant audio signal," or a "predominant sound component") and associated directional information (which may also be referred to as a "spatial component" or, in some instances, as a so-called "V-vector" that identifies spatial characteristics of the corresponding audio object). The spatial component may represent a vector with multiple different elements (which in terms of a vector may be referred to as "coefficients") and thereby may be referred to as a "multidimensional vector."

The spatial audio encoding device 24 may next perform a soundfield analysis with respect to the ambisonic coefficients 21 in order to, at least in part, identify the ambisonic coefficients 21 representative of one or more background (or, in other words, ambient) components of the soundfield. The background components may also be referred to as a "background audio signal" or an "ambient audio signal." The spatial audio encoding device 24 may perform energy compensation with respect to the background audio signal given that, in some examples, the background audio signal may only include a subset of any given sample of the Ambisonic coefficients 21 (e.g., such as those corresponding to zero and first order spherical basis functions and not those corresponding to second or higher order spherical basis functions). When order-reduction is performed, in other words, the spatial audio encoding device 24 may augment (e.g., add/subtract energy to/from) the remaining background ambisonic coefficients of the ambisonic coefficients 21 to compensate for the change in overall energy that results from performing the order reduction.

The spatial audio encoding device 24 may next perform a form of interpolation with respect to the foreground directional information (which is another way of referring to the spatial components) and then perform an order reduction with respect to the interpolated foreground directional information to generate order reduced foreground directional information. The spatial audio encoding device 24 may further perform, in some examples, a quantization with respect to the order reduced foreground directional information, outputting coded foreground directional information. In some instances, this quantization may comprise a scalar/entropy quantization possibly in the form of vector quantization. The spatial audio encoding device 24 may then output the intermediately formatted audio data 25 as the background audio signals, the foreground audio signals, and the quantized foreground directional information.

In any event, the background audio signals and the foreground audio signals may comprise transport channels in some examples. That is, the spatial audio encoding device 24 may output a transport channel for each frame of the ambisonic coefficients 21 that includes a respective one of the background audio signals (e.g., M samples of one of the ambisonic coefficients 21 corresponding to the zero or first order spherical basis function) and for each frame of the foreground audio signals (e.g., M samples of the audio objects decomposed from the ambisonic coefficients 21). The spatial audio encoding device 24 may further output side information (which may also be referred to as "sideband information") that includes the quantized spatial components corresponding to each of the foreground audio signals.

Collectively, the transport channels and the side information may be represented in the example of FIG. 1 as ambisonic transport format (ATF) audio data 25 (which is another way to refer to the intermediately formatted audio data). In other words, the AFT audio data 25 may include the transport channels and the side information (which may also be referred to as "metadata"). The ATF audio data 25 may conform to, as one example, an HOA (Higher Order Ambisonic) Transport Format (HTF). More information regarding the HTF can be found in a Technical Specification (TS) by the European Telecommunications Standards Institute (ETSI) entitled "Higher Order Ambisonics (HOA) Transport Format," ETSI TS 103 589 V1.1.1, dated June 2018 (2018-06). As such, the ATF audio data 25 may be referred to as HTF audio data 25.

The spatial audio encoding device 24 may then transmit or otherwise output the ATF audio data 25 to psychoacoustic audio encoding device 26. The psychoacoustic audio encoding device 26 may perform psychoacoustic audio encoding with respect to the ATF audio data 25 to generate a bitstream 31. The psychoacoustic audio encoding device 26 may operate according to standardized, open-source, or proprietary audio coding processes. For example, the psychoacoustic audio encoding device 26 may perform psychoacoustic audio encoding, such as a unified speech and audio coder denoted as "USAC" set forth by the Moving Picture Experts Group (MPEG), the MPEG-H 3D audio coding standard, the MPEG-I Immersive Audio standard, or proprietary standards, such as AptX™ (including various versions of AptX™ such as enhanced AptX™—E-AptX™, AptX Live™, AptX Stereo™, and AptX high Definition™—AptX-HD™), advanced audio coding (AAC), Audio Codec 3 (AC-3), Apple Lossless Audio Codec (ALAC), MPEG-4 Audio Lossless Streaming (ALS), enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA).

In some examples, the psychoacoustic audio encoding device 26 may represent one or more instances of a psychoacoustic audio coder, each of which is used to encode a transport channel of the ATF audio data 25. In some instances, this psychoacoustic audio encoding device 26 may represent one or more instances of an AptX™ encoding unit (as noted above). The psychoacoustic audio coder unit 26 may, in some instances, invoke an instance of an AptX™ encoding unit for each transport channel of the ATF audio data 25.

In some examples, to generate the different representations of the soundfield using ambisonic coefficients (which again is one example of the audio data 21), the audio encoder 22 may use a coding scheme for ambisonic representations of a soundfield, referred to as Mixed Order ambisonics (MOA) as discussed in more detail in U.S. application Ser. No. 15/672,058, entitled "MIXED-ORDER AMBISONICS (MOA) AUDIO DATA FOR COMPUTER-MEDIATED REALITY SYSTEMS," and filed Aug. 8, 2017, published as U.S. patent publication no. 2019/0007781 on Jan. 3, 2019.

To generate a particular MOA representation of the soundfield, the audio encoder 22 may generate a partial subset of the full set of ambisonic coefficients. For instance, each MOA representation generated by the audio encoder 22 may provide precision with respect to some areas of the soundfield, but less precision in other areas. In one example, an MOA representation of the soundfield may include eight (8) uncompressed ambisonic coefficients of the ambisonic coefficients, while the third order ambisonic representation of the same soundfield may include sixteen (16) uncompressed ambisonic coefficients of the ambisonic coefficients. As such, each MOA representation of the soundfield that is generated as a partial subset of the ambisonic coefficients may be less storage-intensive and less bandwidth intensive (if and when transmitted as part of the bitstream 31 over the illustrated transmission channel) than the corresponding third order ambisonic representation of the same soundfield generated from the ambisonic coefficients.

Although described with respect to MOA representations, the techniques of this disclosure may also be performed with respect to full-order ambisonic (FOA) representations in which all of the ambisonic coefficients for a given order N are used to represent the soundfield. In other words, rather than represent the soundfield using a partial, non-zero subset of the ambisonic coefficients, the soundfield representation generator 302 may represent the soundfield using all of the ambisonic coefficients for a given order N, resulting in a total of ambisonic coefficients equaling $(N+1)^2$.

In this respect, the higher order ambisonic audio data (which is another way to refer to ambisonic coefficients in either MOA representations or FOA representations) may include higher order ambisonic coefficients associated with spherical basis functions having an order of one or less (which may be referred to as "$1^{st}$ order ambisonic audio data"), higher order ambisonic coefficients associated with spherical basis functions having a mixed order and suborder (which may be referred to as the "MOA representation" discussed above), or higher order ambisonic coefficients associated with spherical basis functions having an order greater than one (which is referred to above as the "FOA representation").

Moreover, while shown in FIG. 1 as being directly transmitted to the content consumer 14, the content creator system 12 may output the bitstream 31 to an intermediate device positioned between the content creator system 12 and the content consumer 14. The intermediate device may store the bitstream 31 for later delivery to the content consumer 14, which may request this bitstream. The intermediate device may comprise a file server, a web server, a desktop computer, a laptop computer, a tablet computer, a mobile phone, a smart phone, or any other device capable of storing the bitstream 31 for later retrieval by an audio decoder. The intermediate device may reside in a content delivery network capable of streaming the bitstream 31 (and possibly in conjunction with transmitting a corresponding video data bitstream) to subscribers, such as the content consumer 14, requesting the bitstream 31.

Alternatively, the content creator system 12 may store the bitstream 31 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to those channels by which content stored to these mediums are transmitted (and may include retail stores and other store-based delivery mechanism). In any event, the techniques of this disclosure should not therefore be limited in this respect to the example of FIG. 1.

As further shown in the example of FIG. 1, the content consumer 14 includes the audio playback system 16. The audio playback system 16 may represent any audio playback system capable of playing back multi-channel audio data. The audio playback system 16 may further include an audio decoding device 32. The audio decoding device 32 may represent a device configured to decode ambisonic coefficients 11' from the bitstream 31, where the ambisonic coefficients 11' may be similar to the ambisonic coefficients 21 but differ due to lossy operations (e.g., quantization) and/or transmission via the transmission channel.

The audio decoding device 32 may include a psycho-acoustic audio decoding device 34 and a spatial audio decoding device 36. The psychoacoustic audio decoding device 34 may represent a unit configured to operate reciprocally to the psychoacoustic audio encoding device 26 to reconstruct the ATF audio data 25' from the bitstream 31. Again, the prime notation with respect to the ATF audio data 25 output from the psychoacoustic audio decoding device 34 denotes that the ATF audio data 25' may differ slightly from the ATF audio data 25 due to lossy or other operations performed during compression of the ATF audio data 25. The psychoacoustic audio decoding device 34 may be configured to perform decompression in accordance with standardized, open-source, or proprietary audio coding processing (such as the above noted AptX™, the variations of AptX™, AAC, the variations of AAC, etc.).

While described primarily below with respect to AptX™, the techniques may be applied with respect to other psychoacoustic audio codecs. Examples of other psychoacoustic audio codecs include Audio Codec 3 (AC-3), Apple Lossless Audio Codec (ALAC), MPEG-4 Audio Lossless Streaming (ALS), AptX™, enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA).

In any event, the psychoacoustic audio decoding device 34 may perform psychoacoustic decoding with respect to the foreground audio objects specified in the bitstream 31 and the encoded ambisonic coefficients representative of background audio signals specified in the bitstream 31. In this manner, the psychoacoustic audio decoding device 34 may obtain the ATF audio data 25' and output the ATF audio data 25' to the spatial audio decoding device 36.

The spatial audio decoding device 36 may represent a unit configured to operate reciprocally to the spatial audio encoding device 24. That is, the spatial audio decoding device 36 may dequantize the foreground directional information specified in the bitstream 31. The spatial audio decoding device 36 may further perform dequantization with respect to the quantized foreground directional information to obtain decoded foreground directional information. The spatial audio decoding device 36 may next perform interpolation with respect to the decoded foreground directional information and then determine the ambisonic coefficients representative of the foreground components based on the decoded foreground audio signals and the interpolated foreground directional information. The spatial audio decoding device 36 may then determine the ambisonic coefficients 11' based on the determined ambisonic coefficients representative of the foreground audio signals and the decoded ambisonic coefficients representative of the background audio signals.

The audio playback system 16 may, after decoding the bitstream 31 to obtain the ambisonic coefficients 11', render the ambisonic coefficients 11' to output speaker feeds 39. The audio playback system 16 may include a number of different audio renderers 38. The audio renderers 38 may each provide for a different form of rendering, where the different forms of rendering may include one or more of the various ways of performing vector-base amplitude panning (VBAP), one or more of the various ways of performing binaural rendering (e.g., head related transfer functions—HRTF, Binaural Room Impulse Response—BRIR, etc.), and/or one or more of the various ways of performing soundfield synthesis.

The audio playback system 16 may output speaker feeds 39 to one or more of speakers 40. The speaker feeds 39 may drive the speakers 40. The speakers 40 may represent loudspeakers (e.g., transducers placed in a cabinet or other housing), headphone speakers, or any other type of transducer capable of emitting sounds based on electrical signals.

To select the appropriate renderer or, in some instances, generate an appropriate renderer, the audio playback system 16 may obtain loudspeaker information 41 indicative of a number of the speakers 40 and/or a spatial geometry of the speakers 40. In some instances, the audio playback system 16 may obtain the loudspeaker information 41 using a reference microphone and driving the speakers 40 in such a manner as to dynamically determine the speaker information 41. In other instances, or in conjunction with the dynamic determination of the speaker information 41, the audio playback system 16 may prompt a user to interface with the audio playback system 16 and input the speaker information 41.

The audio playback system 16 may select one of the audio renderers 38 based on the speaker information 41. In some instances, the audio playback system 16 may, when none of the audio renderers 38 are within some threshold similarity measure (in terms of the loudspeaker geometry) to that specified in the speaker information 41, generate the one of audio renderers 38 based on the speaker information 41. The audio playback system 16 may, in some instances, generate the one of audio renderers 38 based on the speaker information 41 without first attempting to select an existing one of the audio renderers 38.

While described with respect to speaker feeds 39, the audio playback system 16 may render headphone feeds from either the speaker feeds 39 or directly from the ambisonic coefficients 11', outputting the headphone feeds to headphone speakers. The headphone feeds may represent binaural audio speaker feeds, which the audio playback system 16 renders using a binaural audio renderer.

As described above, the psychoacoustic audio encoding device 26 may execute an instance of the psychoacoustic audio encoder for each transport channel of the ATF audio data 25, effectively creating multiple bitstreams that are multiplexed to form the overall bitstream 31, where these multiple bitstreams may be denoted as "sub-bitstreams" to distinguish these sub-bitstreams from the bitstream 31. The psychoacoustic audio encoding device 26 may output the bitstream to the audio playback system 16, which in some instances may consume power from a power limited supply (e.g., a battery), such as when the audio playback system 16 represents a mobile device.

Given the power limited supply, the psychoacoustic audio decoding device 34 of the audio playback system 16 may execute a single instance of the psychoacoustic audio decoder to decode the bitstream 31 to obtain the ATF audio data 25'. The audio playback system 16 may execute a single instance of the psychoacoustic audio decoder to avoid excessive energy consumption by multiple instances of the psychoacoustic audio decoder. However, even the single instance of the psychoacoustic audio decoder may consume significant power when decoding a full 3D soundfield represented by the ATF audio data 25' such that the multiple sub-bitstreams of the bitstream 31 may prevent mobile devices or other power-limited devices from decoding and rendering the ATF audio data 25'.

In accordance with various aspects of the techniques described in this disclosure, the psychoacoustic audio decoding device 25' may obtain operating conditions of the audio playback system 16 for decoding the bitstream 31 (which may also be referred to as the "encoded scene-based audio data 31"). That is, the psychoacoustic audio decoding device 25' may monitor the audio playback system 16, identifying the operating conditions in terms of a battery level and/or a communication link status (e.g., of the link configured to operate via the transmission channel between the content creator system 12 and the audio playback system 16). The psychoacoustic audio decoding device 34 may adapt application of the single instance of the psychoacoustic audio decoder to the bitstream 31 based on the operating condition to potentially reduce power consumption.

To illustrate, assume that a status of the communication link is the operating condition, and the psychoacoustic audio decoding device 34 determines the status of the communication link in terms of a signal to noise ratio (SNR). When the psychoacoustic audio decoding device 34 determines that the SNR is below a threshold, the psychoacoustic audio decoding device 34 may invoke the single instance of the psychoacoustic audio decoder to perform the psychoacoustic audio decoding with respect to the bitstream 31 to decode a subset of bits representative of the ATF audio data 25' (which is an example of intermediately formatted scene-based audio data). The subset of bits may include less than a total number of bits used to represent the ATF audio data 25.

By only decoding a subset of the bits representative of the ATF audio data 25', the psychoacoustic audio decoding device 34 may reduce the number of operations performed by the underlying hardware, thereby reducing the number of processor cycles expended to decode the bitstream 31. By reducing the number of processor cycles expended to decode the bitstream 31, the psychoacoustic audio decoding device 34 may reduce power consumption (both by the processors and by any busses used to communicate the ATF audio data 25' considering that less bits decoded results in less bus bandwidth consumption). Further, by reducing the bit depth of the ATF audio data 25', components downstream from the psychoacoustic audio decoding device 34, such as the spatial audio decoding device 36 and the audio renderers 38, may consume less power as the subset of bits used to represent the ATF audio data 25' require less processor cycles to process in order to obtain the speaker feeds 29. In addition, the reduction in bit depth may not overly impact a perceived quality during playback because the low SNR indicates that link errors are likely to occur, which may mask the reduced quality of the ATF audio data 25'.

Figure 2:
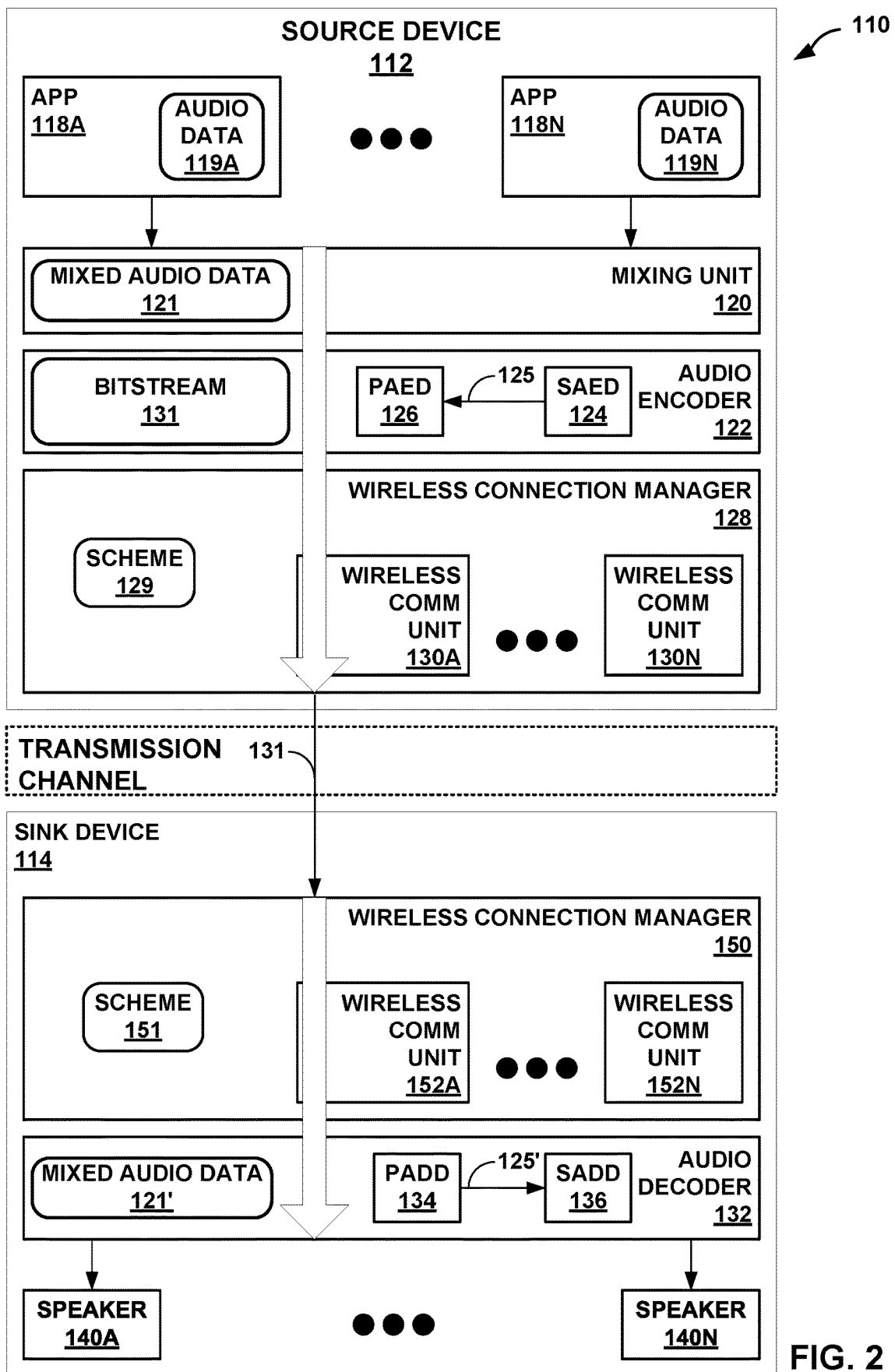
FIG. 2 is a diagram illustrating another example of a system that may perform various aspects of the techniques described in this disclosure.

FIG. 2 is a diagram illustrating another example of a system that may perform various aspects of the techniques described in this disclosure. The system 110 of FIG. 2 may represent one example of the system 10 shown in the example of FIG. 1. As shown in the example of FIG. 2, the system 110 includes a source device 112 and a sink device 114, where the source device 112 may represent an example of the content creator system 12 and the sink device 114 may represent an example of the content consumer 14 and/or the audio playback system 16.

Although described with respect to the source device 112 and the sink device 114, the source device 112 may operate, in some instances, as the sink device, and the sink device 114 may, in these and other instances, operate as the source device. As such, the example of system 110 shown in FIG. 2 is merely one example illustrative of various aspects of the techniques described in this disclosure.

In any event, the source device 112 may, as noted above, represent any form of computing device capable of implementing the techniques described in this disclosure, including a handset (or cellular phone, including a so-called "smartphone"), a tablet computer, a so-called smart phone, a remotely piloted aircraft (such as a so-called "drone"), a robot, a desktop computer, a receiver (such as an audio/visual—AV—receiver), a set-top box, a television (including so-called "smart televisions"), a media player (such as a digital video disc player, a streaming media player, a Blue-Ray Disc™ player, etc.), or any other device capable of communicating audio data wirelessly to a sink device via a personal area network (PAN). For purposes of illustration, the source device 112 is assumed to represent a smartphone.

The sink device 114 may represent any form of computing device capable of implementing the techniques described in this disclosure, including a handset (or, in other words, a cellular phone, a mobile phone, a mobile handset, etc.), a tablet computer, a smartphone, a desktop computer, a wireless headset (which may include wireless headphones that include or exclude a microphone, and so-called smart wireless headphones that include additional functionality such as fitness monitoring, on-board music storage and/or playback, dedicated cellular capabilities, etc.), a wireless speaker (including a so-called "smart speaker"), a watch (including so-called "smart watches"), or any other device capable of reproducing a soundfield based on audio data communicated wirelessly via the PAN. Also, for purposes of illustration, the sink device 114 is assumed to represent wireless headphones.

As shown in the example of FIG. 2, the source device 112 includes one or more applications ("apps") 118A-118N ("apps 118"), a mixing unit 120, an audio encoder 122 (which includes a spatial audio encoding device—SAED—124 and a psychoacoustic audio encoding device—PAED—126), and a wireless connection manager 128. Although not shown in the example of FIG. 2, the source device 112 may include a number of other elements that support operation of apps 118, including an operating system, various hardware and/or software interfaces (such as user interfaces, including graphical user interfaces), one or more processors (which may be denoted as "processor(s)"), memory, storage devices, and the like.

Each of the apps 118 represent software (such as a collection of instructions stored to a non-transitory computer readable media) that configure the system 110 to provide some functionality when executed by the one or more processors of the source device 112. The apps 118 may, to list a few examples, provide messaging functionality (such as access to emails, text messaging, and/or video messaging), voice calling functionality, video conferencing functionality, calendar functionality, audio streaming functionality, direction functionality, mapping functionality, gaming functionality. Apps 118 may be first party applications designed and developed by the same company that designs and sells the operating system executed by the source device 112 (and often pre-installed on the source device 112) or third-party applications accessible via a so-called "app store" or possibly pre-installed on the source device 112. Each of the apps 118, when executed, may output audio data 119A-119N ("audio data 119"), respectively.

In some examples, the audio data 119 may be generated from a microphone (not pictured, but similar to microphones 5 shown in the example of FIG. 1) connected to the source device 112. The audio data 119 may include ambisonic coefficients similar to ambisonic audio data 21 discussed above with respect to the example of FIG. 1, where such ambisonic audio data may be referred to as "scene-based audio data." As such, the audio data 119 may also be referred to as "scene-based audio data 119" or "ambisonics audio data 119."

Although described with respect to ambisonics audio data, the techniques may be performed with respect to ambisonics audio data that does not necessarily include coefficients corresponding to so-called "higher order" spherical basis functions (e.g., spherical basis functions having an order greater than one). Accordingly, the techniques may be performed with respect to ambisonic audio data that includes coefficients corresponding to only a zero order spherical basis function, or only a zero and first order spherical basis functions.

The mixing unit 120 represents a unit configured to mix one or more of audio data 119 output by the apps 118 (and other audio data output by the operating system-such as alerts or other tones, including keyboard press tones, ringtones, etc.) to generate mixed audio data 121. Audio mixing may refer to a process whereby multiple sounds (as set forth in the audio data 119) are combined into one or more channels. During mixing, the mixing unit 120 may also manipulate and/or enhance volume levels (which may also be referred to as "gain levels"), frequency content, and/or panoramic position of the ambisonic audio data 119. In the context of streaming the ambisonic audio data 119 over a wireless PAN session, the mixing unit 120 may output the mixed audio data 121 to the audio encoder 122.

The audio encoder 122 may be similar, if not substantially similar, to the audio encoder 22 described above in the example of FIG. 1. That is, the audio encoder 122 may represent a unit configured to encode the mixed audio data 121 and thereby obtain encoded audio data in the form of a bitstream 131. In some examples, the audio encoder 122 may encode individual ones of the audio data 119.

Referring for purposes of illustration to one example of the PAN protocols, Bluetooth® provides for a number of different types of audio codecs (which is a word resulting from combining the words "encoding" and "decoding") and is extensible to include vendor specific audio codecs. The Advanced Audio Distribution Profile (A2DP) of Bluetooth® indicates that support for A2DP requires supporting a sub-band codec specified in A2DP. A2DP also supports codecs set forth in MPEG-1 Part 3 (MP2), MPEG-2 Part 3 (MP3), MPEG-2 Part 7 (advanced audio coding—AAC), MPEG-4 Part 3 (high efficiency-AAC—HE-AAC), and Adaptive Transform Acoustic Coding (ATRAC). Furthermore, as noted above, A2DP of Bluetooth® supports vendor specific codecs, such as aptX™ and various other versions of aptX™ (e.g., enhanced aptX™—E-aptX™, aptX Live™, and aptX high definition—aptX-HD™).

The audio encoder 122 may operate consistent with one or more of any of the above listed audio codecs, as well as, audio codecs not listed above, but that operate to encode the mixed audio data 121 to obtain the encoded audio data 131 (which is another way to refer to the bitstream 131). The audio encoder 122 may first invoke the SAED 124, which may be similar if not substantially similar to SAED 24 shown in the example of FIG. 1. The SAED 124 may perform the above noted spatial audio compression with respect to the mixed audio data to obtain ATF audio data 125 (which may be similar if not substantially similar to the ATF audio data 25 shown in the example of FIG. 1). The SAED 124 may output the ATF audio data 25 to the PAED 126.

The PAED 126 may be similar if not substantially similar to the PAED 26 shown in the example of FIG. 1. The PAED 126 may perform psychoacoustic audio encoding according to any of the foregoing codecs (including AptX™ and variations thereof) to obtain the bitstream 131. The audio encoder 122 may output the encoded audio data 131 to one of the wireless communication units 130 (e.g., the wireless communication unit 130A) managed by the wireless connection manager 128.

The wireless connection manager 128 may represent a unit configured to allocate bandwidth within certain frequencies of the available spectrum to the different ones of the wireless communication units 130. For example, the Bluetooth® communication protocols operate over within the 2.5 GHz range of the spectrum, which overlaps with the range of the spectrum used by various WLAN communication protocols. The wireless connection manager 128 may allocate some portion of the bandwidth during a given time to the Bluetooth® protocol and different portions of the bandwidth during a different time to the overlapping WLAN protocols. The allocation of bandwidth and other is defined by a scheme 129. The wireless connection manager 128 may expose various application programmer interfaces (APIs) by which to adjust the allocation of bandwidth and other aspects of the communication protocols so as to achieve a specified quality of service (QOS). That is, the wireless connection manager 128 may provide the API to adjust the scheme 129 by which to control operation of the wireless communication units 130 to achieve the specified QoS.

In other words, the wireless connection manager 128 may manage coexistence of multiple wireless communication units 130 that operate within the same spectrum, such as certain WLAN communication protocols and some PAN protocols as discussed above. The wireless connection manager 128 may include a coexistence scheme 129 (shown in FIG. 2 as "scheme 129") that indicates when (e.g., an interval) and how many packets each of the wireless communication units 130 may send, the size of the packets sent, and the like.

The wireless communication units 130 may each represent a wireless communication unit 130 that operates in accordance with one or more communication protocols to communicate the bitstream 131 via a transmission channel to the sink device 114. In the example of FIG. 2, the wireless communication unit 130A is assumed for purposes of illustration to operate in accordance with the Bluetooth® suite of communication protocols. It is further assumed that the wireless communication unit 130A operates in accordance with A2DP to establish a PAN link (over the transmission channel) to allow for delivery of the bitstream 131 from the source device 112 to the sink device 114.

More information concerning the Bluetooth® suite of communication protocols can be found in a document entitled "Bluetooth Core Specification v 5.0," published Dec. 6, 2016, and available at: www.bluetooth.org/en_us/specification/adopted_specifications. More information concerning A2DP can be found in a document entitled "Advanced Audio Distribution Profile Specification," version 1.3.1, published on Jul. 14, 2015. Although assumed to operate in accordance with the Bluetooth® suite of communication protocols, the wireless communication unit 130A may operate using any form of wireless communication, including WiFi™, cellular communication (including so-called 3G, 4G and 5G cellular data communications) or any other form of wireless communication.

The wireless communication unit 130A may output the bitstream 131 to the sink device 114 via a transmission channel, which is assumed to be a wireless channel in the example of Bluetooth. While shown in FIG. 2 as being directly transmitted to the sink device 114, the source device 112 may output the bitstream 131 to an intermediate device positioned between the source device 112 and the sink device 114. The intermediate device may store the bitstream 131 for later delivery to the sink device 14, which may request the bitstream 131. The intermediate device may comprise a file server, a web server, a desktop computer, a laptop computer, a tablet computer, a mobile phone, a smart phone, or any other device capable of storing the bitstream 131 for later retrieval by an audio decoder. This intermediate device may reside in a content delivery network capable of streaming the bitstream 131 (and possibly in conjunction with transmitting a corresponding video data bitstream) to subscribers, such as the sink device 114, requesting the bitstream 131.

Alternatively, the source device 112 may store the bitstream 131 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to those channels by which content stored to these mediums are transmitted (and may include retail stores and other store-based delivery mechanism). In any event, the techniques of this disclosure should not therefore be limited in this respect to the example of FIG. 2.

As further shown in the example of FIG. 2, the sink device 114 includes a wireless connection manager 150 that manages one or more of wireless communication units 152A-152N ("wireless communication units 152") according to a scheme 151, an audio decoder 132 (including a psychoacoustic audio decoding device—PADD—134 and a spatial audio decoding device—SADD—136), and one or more speakers 140A-140N ("speakers 140," which may be similar to the speakers 40 shown in the example of FIG. 1). The wireless connection manager 150 may operate in a manner similar to that described above with respect to the wireless connection manager 128, exposing an API to adjust scheme 151 by which operation of the wireless communication units 152 to achieve a specified QoS.

The wireless communication units 152 may be similar in operation to the wireless communication units 130, except that the wireless communication units 152 operate reciprocally to the wireless communication units 130 to receive the bitstream 131 via the transmission channel. One of the wireless communication units 152 (e.g., the wireless communication unit 152A) is assumed to operate in accordance with the Bluetooth® suite of communication protocols and reciprocal to the wireless communication protocol. The wireless communication unit 152A may output the bitstream 131 to the audio decoder 132.

The audio decoder 132 may operate in a manner that is reciprocal to the audio encoder 122. The audio decoder 132 may operate consistent with one or more of any of the above listed audio codecs, as well as, audio codecs not listed above, but that operate to decode the encoded audio data 131 to obtain mixed audio data 121'. Again, the prime designation with respect to "mixed audio data 121" denotes that there may be some loss due to quantization or other lossy operations that occur during encoding by the audio encoder 122.

The audio decoder 132 may invoke the PADD 134 to perform psychoacoustic audio decoding with respect to the bitstream 131 to obtain ATF audio data 125', which the PADD 134 may output to the SADD 136. The SADD 136 may perform spatial audio decoding to obtain the mixed audio data 121'. Although renderers (similar to the renderers 38 of FIG. 1) are not shown in the example of FIG. 2 for ease of illustration purposes, the audio decoder 132 may render the mixed audio data 121' to speaker feeds (using any of the renderers, such as renderers 38 discussed above with respect to the example of FIG. 1) and output the speaker feeds to one or more of the speakers 140.

Each of the speakers 140 represent a transducer configured to reproduce a soundfield from the speaker feeds. The transducer may be integrated within the sink device 114 as shown in the example of FIG. 2 or may be communicatively coupled to the sink device 114 (via a wire or wirelessly). The speakers 140 may represent any form of speaker, such as a loudspeaker, a headphone speaker, or a speaker in an earbud. Furthermore, although described with respect to a transducer, the speakers 140 may represent other forms of speakers, such as the "speakers" used in bone conducting headphones that send vibrations to the upper jaw, which induces sound in the human aural system.

As described above, PADD 134 may monitor the operating conditions of the sink device 114 and thereby obtain the operating conditions in terms of, as a few examples, a battery level and/or a status of a communication link between the source device 112 and the sink device 114 over the transmission channel. Based on the operating conditions PADD 134 may adapt operation of the single instance of the psychoacoustic audio decoder to possibly reduce power consumption.

To illustrate, consider another example in which that the mixed audio data 121 comprises ambisonic audio data that is defined in terms of ambisonic coefficients corresponding to spherical basis functions having an order of zero up to a maximum order (e.g., two, three, or four). Given the relationship to the spherical basis functions, the ambisonic audio data is defined in the spherical harmonic domain. Moreover, even after undergoing the transformation using the linear invertible transform during spatial audio encoding, the resulting foreground audio signals and the corresponding spatial components also reside in the spherical harmonic domain as the linear invertible transform does not transform the foreground audio signals and the spatial component between domains.

In any event, the PADD 134 may instantiate the single instance of the psychoacoustic audio decoder to perform, when the battery level, a status of the communication link or some combination thereof is below a threshold, the psychoacoustic audio decoding with respect to the bitstream 31 to decode ATF audio data 25' associated with a subset of orders. In some examples, the PADD 134 only decodes the ATF audio data 25' associated with the subset of orders, where the subset of orders is less than all of the orders of the spherical basis functions to which the ATF audio data 25' corresponds. The PADD 134 may output the order-reduced ATF audio data 25' to the SADD 136, which may perform spatial audio decoding with respect to the order-reduced ATF audio data 25' to reconstruct or otherwise obtain the mixed audio data 121'.

By only decoding a subset of orders of spherical basis functions to which the ATF audio data 25' corresponds, the PADD 134 may again decrease a number of operations performed (and associated processor cycles, bus bandwidth, etc.). As such, the PADD 134 may reduce power consumption as a result of the fewer number of operations performed, which may facilitate longer battery life, thereby trading quality for extended playback. More information regarding the audio decoder 132 is described below with respect to FIGS. 3A and 3B.

Figure 3A:
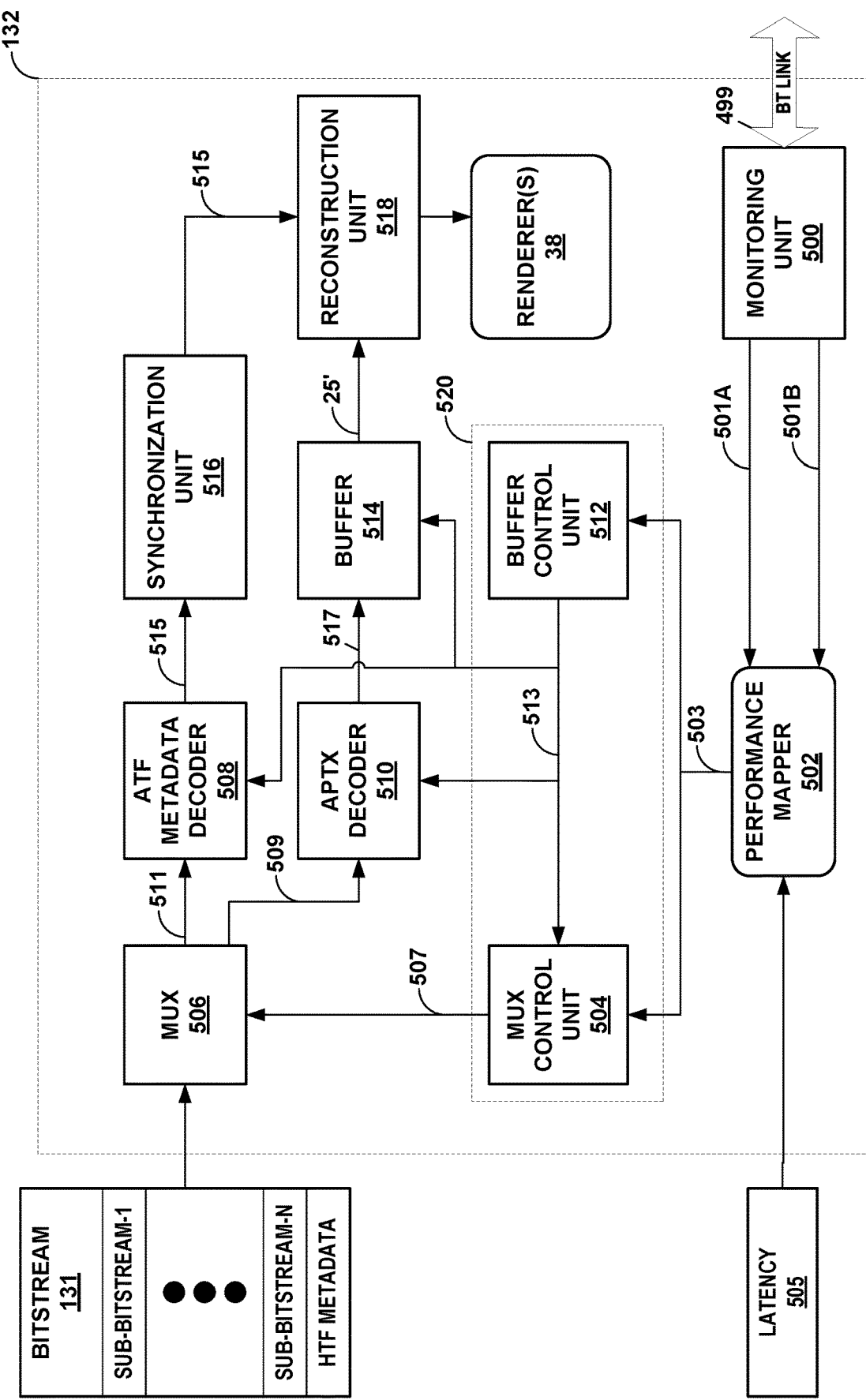
FIGS. 3A and 3B are block diagrams illustrating an example of the audio decoder of FIG. 2 in more detail.
Figure 3B:
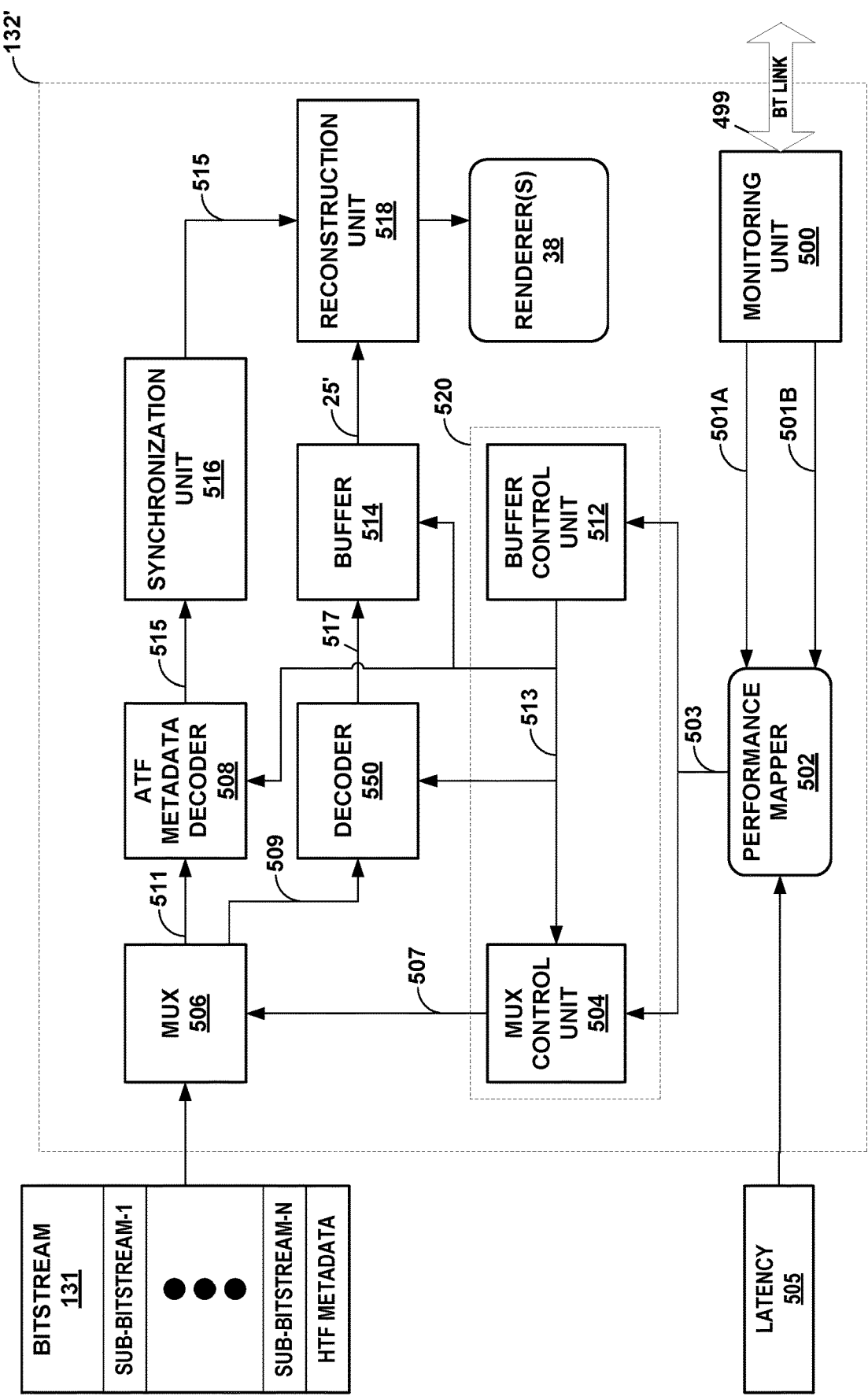

FIGS. 3A and 3B are block diagrams illustrating examples of the audio decoder of FIG. 2 in more detail. The audio decoder 132 shown in the example of FIG. 3A represents both the PADD 134 and the SADD 136, where the PADD 134 has been integrated with the SADD 136, which is shown in the example of FIG. 3A as the reconstruction unit 516. Furthermore, the renderers 38 are also shown as being integrated into the audio decoder 132.

As further shown in the example of FIG. 3A, the audio decoder 132 includes a monitoring unit 500, a performance mapper 502, a multiplexer ("mux") control unit 504, a mux 506, an ATF metadata decoder 508, an AptX™ decoder 510, a buffer control unit 512, a buffer 514, a synchronization unit 516, and a reconstruction unit 518. The monitoring unit 500 represents a unit configured to monitor the audio playback device 16 to obtain an operating condition 501A and/or 501B.

The monitoring unit 500 may, as one example, monitor a communication link, such as a Bluetooth® (BT) link 499 or any other form of wireless and/or wired communication link, to obtain the operating condition 501A, which may include an indication of signal quality (e.g., the above noted SNR), bandwidth, loss, noise, or any other indication for a communication link. The monitoring unit 500 may, as another example, monitor the battery or other power source of the audio playback device 16 to obtain the operating conditions 501B, which may include an indication of battery level (e.g., a percentage of battery life remaining), projected battery duration (e.g., in units of time), and any other indication for a battery.

The performance mapper 502 may represent a unit configured to translate the operating conditions 501A and 501B (the "operating conditions 501") to a priority level 503. The performance mapper 502 may also obtain a latency requirement 505 as an input that factors in the translation of the operating conditions 501 to the priority level 503 increasing decoding priority (and possibly reducing quality by selecting to decode fewer bits or decode ambisonic audio data associated with spherical basis functions having only a subset of all the orders) when the latency requirement 505 is low and reducing decoding priority (and possibly increasing quality by decoding a larger number of bits or more ambisonic audio data associated with spherical basis functions having both the subset of orders and additional orders) when the latency requirement 505 is high.

The performance mapper 502 may interface with a consumer or other user of the audio playback device 16 (e.g., via one of apps 118) to obtain the latency requirement 505 (shown in the example of FIG. 3A as "latency 505") or retrieve a predefined latency requirement 505 (which may be statically defined by, as one example, the one of apps 118). The performance mapper 502 may output the priority level 503 to the mux control unit 504 and the buffer control unit 512.

The buffer control unit 512 may represent a unit configured to control storage of data to the buffer 514. The buffer control unit 512 may also determine, based on the priority level 503, which of sub-bitstreams 509 of the bitstream 131 to decode from the bitstream 131 in order to reconstruct the ATF audio data 25'. The buffer control unit 512 may output an indication 513 to each of the mux control unit 504, the ATF metadata decoder 508, the AptX™ decoder 510, and the buffer 514, where the indication 513 identifies which of the sub-bitstreams 509 to decode and buffer. The indication 513 identifies an order of the spherical basis functions to which ambisonic coefficients representative of the background audio signals correspond, and one or more foreground audio signals to obtain from the bitstream 131.

The mux control unit 504 may represent a unit configured to control mux 506. The mux control unit 504 may output control signals 507 to control mux 506. The mux control unit 504 may determine control signals 507 based on priority level 503, where the control signals 507 indicate which of sub-bitstream-1 through sub-bitstream-N to output to the AptX™ decoder 510 (which may represent a decoder configured to decode each sub-bitstream according to an AptX™ decoding algorithm) as the sub-bitstreams 509. The control signals 507 may also identify a number of bits (or, in other words, a bit depth) for each sample of the background audio signals and the foregoing audio signals identified by the indication 513 to parse from the bitstream 131.

Each of the sub-bitstreams 509 may represent a separate encoded transport channel of the ATF audio data 25', which may include either background ambisonic coefficients (or, more generally, a background audio signals representative of a background component of the soundfield) or a foreground audio signal (representative of a foreground component of the soundfield). The mux control unit 504 may also output control signals 507 that configure the mux 506 to output ATF metadata 511 (which may define a spatial component for each of the foreground audio signals) to the ATF metadata decoder 508.

The ATF metadata decoder 508 may represent a unit configured to process the ATF metadata 511 to output spatial components 515. The ATF metadata decoder 508 may perform various operations discussed in more detail above with respect to the spatial audio decoding device 36 of FIG. 1 in order to decode the spatial components prior to outputting the spatial components 515 to the synchronization unit 516.

The AptX™ decoder 510 may, as noted above, represent a unit configured to decode each of the sub-bitstreams 509 to obtain transport channels 517. The AptX™ decoder 510 may implement a single instance of an AptX™ decompression algorithm that conforms to one or more of the AptX™ codecs listed above, including E-AptX™, AptX Live™, AptX-HD™, AptX Stereo™, and the like.

In some examples, the AptX™ decoder 510 may execute the single instance of the AptX™ decompression algorithm to obtain a quantized gain and a quantized shape representative of the transport channels specified by the sub-bitstreams 509. The AptX™ decoder 510 may obtain a number of course bits used during quantization of the gain (or, in other words, the energy) of the ambisonic transport format audio data, which in this instance is represented by the sub-bitstreams 509. The AptX™ decoder 510 may also determine a number of fine bits used during quantization of the gain (or, in other words, energy) for each of the sub-bitstreams 509. The AptX™ decoder 510 may perform psychoacoustic audio decoding with respect to the encoded scene-based audio data (which is represented by the sub-bitstreams 509) to decode the number of course bits and the number of fine bits representative of the energy (or, in other words, gain) for each of the sub-bitstreams 509 and thereby obtain a decompressed energy.

The single instance of the AptX™ decompression algorithm executed by the AptX™ decoder 510 may also dequantize the quantized shape. In some examples, the AptX™ decoder 510 may perform vector dequantization with respect to the quantized shape to decompress the quantized shape and obtain the decompressed shape. The AptX™ decoder 510 may perform gain/shape synthesis with respect to the decompressed energy and the decompressed shape to reconstruct the transport channels 517. The AptX™ decoder 510 may output the transport channels 517 to the buffer 514.

The synchronization unit 516 may receive the spatial components 515 and synchronize output of the spatial components to align the spatial components 515 with the corresponding predominant audio signals stored to the buffer 514. The synchronization unit 516 may coordinate delivery of the spatial components 515 to the reconstruction unit 518 such that the spatial components 515 are correctly aligned (in time) with the AFT audio data 25', as the buffer 514 injects some latency into decoding that the synchronization unit 516 may correct via injection of latency in the spatial component coding path. The synchronization unit 516 may output the spatial components 515 to the reconstruction unit 518 in time with the buffer 514 delivering different portions of the transport channels represented by the AFT audio data 25'.

The reconstruction unit 518 may represent a unit configured to reconstruct, based on the spatial components 515 and the AFT audio data 25', the mixed audio data 121', as described in more detail above. The reconstruction unit 518 may output the mixed audio data 121' to the renderer 38, which may render the mixed audio data 121' to one or more speaker feeds. The renderer 38 may output the speaker feeds to one or more speakers 103, which may reproduce, based on the speaker feeds, the soundfield represented by the mixed audio data 121'.

Referring next to the example of FIG. 3B, the audio decoding device 132' is similar to the audio decoding device 132 shown in the example of FIG. 3A except that the audio decoding device 132' includes a general decoder 550 that replaces the AptX decoder 510. The decoder 550 may represent any type of psychoacoustic audio decoder, such as a unified speech and audio coder denoted as "USAC" set forth by the Moving Picture Experts Group (MPEG), the MPEG-H 3D audio coding standard, the MPEG-I Immersive Audio standard, or proprietary standards, such as AptX™ (including various versions of AptX™ such as enhanced AptX—E-AptX™, AptX Live™, AptX Stereo™, and AptX high definition—AptX-HD™), advanced audio coding (AAC), Audio Codec 3 (AC-3), Apple Lossless Audio Codec (ALAC), MPEG-4 Audio Lossless Streaming (ALS), enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA).

Figure 4:
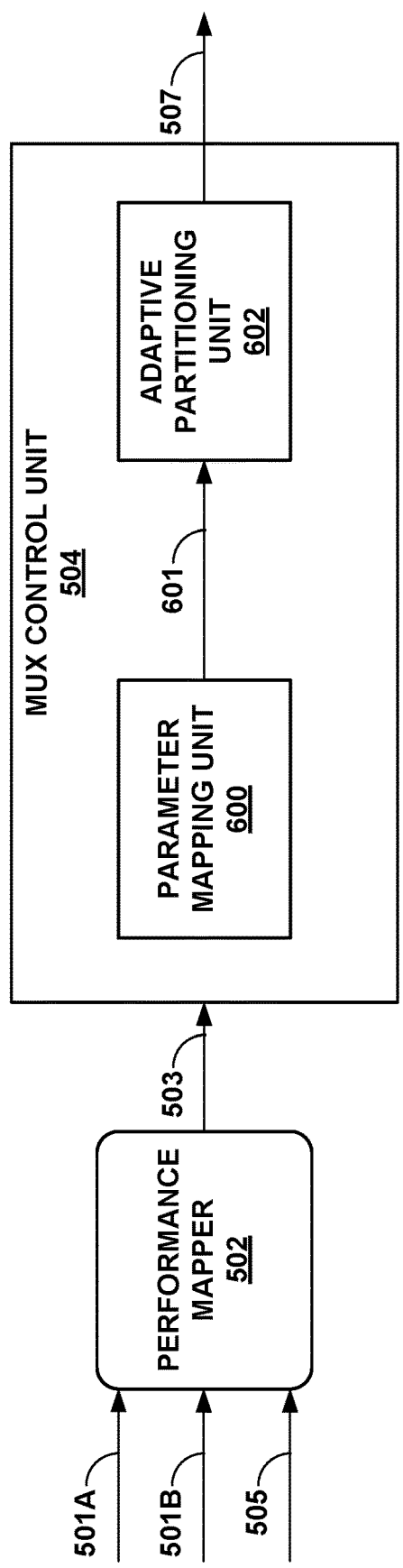
FIG. 4 is a block diagram illustrating, in more detail, an example of the mux control unit shown in the example of FIGS. 3A and 3B.

FIG. 4 is a block diagram illustrating, in more detail, an example of the mux control unit shown in the examples of FIGS. 3A and 3B. As described above with respect to the example of FIG. 3A, the performance mapper 502 may obtain the operating conditions 501 and the latency requirement 505 and determine, based on one or more of the operating conditions 501 and the latency requirement 505, the priority level 503. The performance mapper 502 may include a table or other data structure that receives, as one or more inputs, one or more of the operating conditions 501 and the latency requirement 505. The table may include a lookup table, which outputs, based on one or more of the inputs, the priority level 503. The performance mapper 502 may perform machine learning with respect to the lookup table to develop the lookup table over time. As discussed above, the performance mapper 502 may output the priority level 503 to the mux control unit 504.

As shown in the example of FIG. 4, the mux control unit 504 may include a parameter mapping unit 600 and an adaptive partitioning unit 602. The parameter mapping unit 600 may represent a unit configured to map the priority level 503 to one or more parameters 601. The parameters 601 may include a number of bits to retain from the sub-bitstreams 509, a number of spherical basis function orders to which the background audio signals correspond, and a number of foreground audio signals to consider. The parameter mapping unit 600 may output the parameters 601 to the adaptive partitioning unit 602.

The adaptive partitioning unit 602 may processes the parameters 601 to obtain the control signals 507. That is, the adaptive partitioning unit 602 may output control signals 507 that effectively indicate that, when the priority level 503 (which is representative of one or more of the operating conditions 501 and the latency requirement 505) is below a threshold, only a subset of bits representative of the ATF audio data 25 are to be decoded (where the subset of bits is less than the total number of bits used to represent the AFT audio data 25). The mux 506 may then only output the indicated subset of bits, resulting in the AptX™ decoder 510 performing psychoacoustic audio decoding with respect to the sub-bitstreams 509 (which represent encoded scene-based audio data) to decode only the subset of bits representative of the ATF audio data 25'.

In some examples, the parameter mapping unit 600 may determine the number of bits to retain from the sub-bitstreams 509 as the course bits used to represent the energy (or, in other words, gain). When the priority level 503 is below a threshold, the parameter mapping unit 600 may output parameters 601 to indicate that only the course bits (and not the fine bits) are to be parsed from the sub-bitstreams 509, thereby resulting in the AptX™ decoder 510 performing psychoacoustic audio decoding with respect to only the course bits (and not the fine bits) of the sub-bitstreams 509. When the priority level 503 is greater than or equal to the threshold, the parameter mapping unit 600 may output parameters 601 to indicate that both the course bits and the fine bits are to be parsed from the sub-bitstreams 509, resulting in the AptX™ decoder 510 performing psychoacoustic audio decoding with respect to both the course bits and the fine bits (which are one example of additional bits) of the sub-bitstreams 509.

In this respect, the audio decoder 132 may decode more or less bits by exploiting the layered structure of AptX™ (e.g., the course and fine energy). When the priority level 503 is below a threshold (or, in other words, "low"), the audio decoder 132 only decodes the course bits of the energy. When the priority level is greater than or equal to the threshold (or, in other words, "high"), the audio decoder 132 may decode the course and fine bits of the energy. As such, the audio decoder 132 may decode the full sound field by adapting quality of the decoding (where quality is denoted by a bit resolution).

In some instances, rather than decode some subset of the bits, the audio decoder 132 may decode all of the bits for a select subset of the ATF audio data 25' when the priority level 503 is less than the threshold. The parameter mapping unit 600 may identify the select subset of the ATF audio data 25' in terms of an order of a spherical basis function to which ambisonic coefficients correspond (e.g., such as zero or one), and a subset of the foreground audio signals, thereby outputting control signals 507 that specify only a subset of the sub-bitstreams 509 are to be provided to the AptX™ decoder 510 (such as the first order ambisonic coefficients denoted as W, X, Y, and Z), and one or more and possibly all of the foreground audio signals. The AptX™ decoder 510 may, in this instance, perform, when the operating condition is below a threshold, the psychoacoustic audio decoding with respect to the sub-bitstreams 509 to decode higher order ambisonic audio data corresponding to spherical basis functions having a subset of orders, the subset of orders being less than all of the orders of the spherical basis functions to which the sub-bitstreams 509 correspond.

When the priority level 503 is greater than or equal to the threshold, the parameter mapping unit 600 may indicate that the sub-bitstreams 509 corresponding to spherical basis functions having subset of orders and at least one additional order (and possibly all of the orders) is to be output to the AptX™ decoder 510 for psychoacoustic audio decoding. The AptX™ decoder 510 may in this respect perform, when the priority level 503 (which is indicative, at least in part, of the operating conditions 501) is above a threshold, the psychoacoustic audio decoding with respect to the sub-bitstreams 509 to reconstruct ATF audio data 25' corresponding to spherical basis functions having a subset of orders and at least one additional order, the subset of orders being less than all of the orders of the spherical basis functions to which the ATF audio data 25 corresponds.

In this way, the audio decoder 132 may decode certain ambisonic orders and/or background/foreground audio signals by exploiting the layered structure of ambisonic (e.g., the first, second, third, . . . , N-th orders). When the priority level 503 is below a threshold (or, in other words, "low"), the audio decoder 132 only decodes lower orders (e.g., first and second). When the priority level is greater than or equal to the threshold (or, in other words, "high"), the audio decoder 132 may decode higher orders (e.g., third and fourth). As such, the audio decoder 132 may decode the soundfield by adapting spatial accuracy of the decoding while decoding all the bits (sacrificing spatial resolution but retaining quality).

In some instances, the parameter mapping unit 600 may generate parameters 601 that indicate some combination of the foregoing two different aspects of the techniques. As such, the AptX™ decoder 510 may perform the psychoacoustic audio decoding with respect to the sub-bitstreams 509 to decode higher order ambisonic audio data corresponding to all of the orders up to a defined order either when reconstructing the subset of bits or both the subset of bits and the additional bits.

Figure 5:
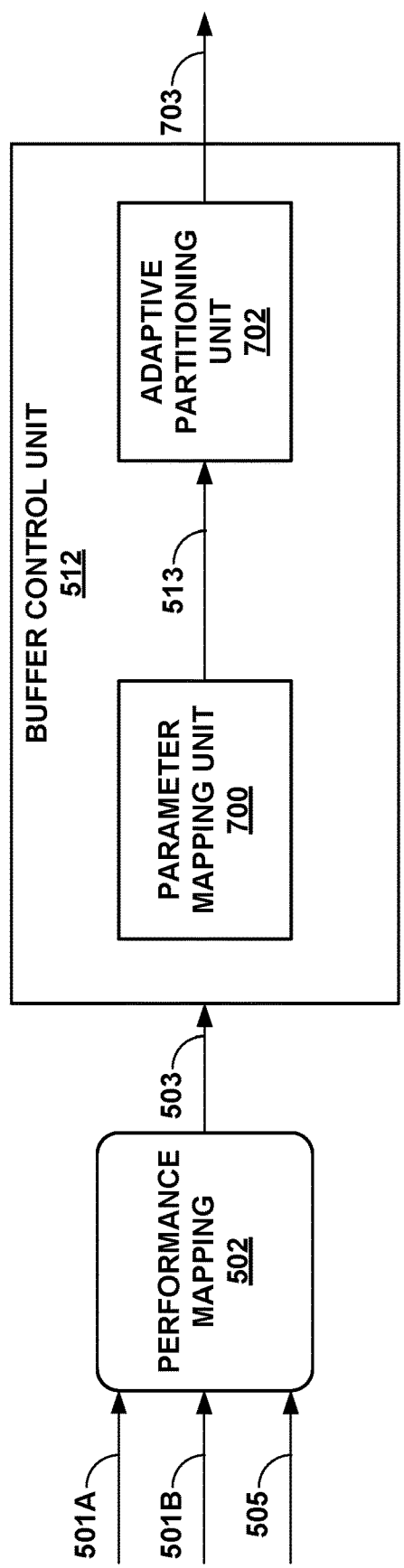
FIG. 5 is a block diagram illustrating, in more detail, an example of the buffer control unit of FIGS. 3A and 3B.

FIG. 5 is a block diagram illustrating, in more detail, an example of the buffer control unit of FIGS. 3A and 3B. As described above with respect to the example of FIG. 3A, the performance mapper 502 may obtain the operating conditions 501 and the latency requirement 505 and determine, based on one or more of the operating conditions 501 and the latency requirement 505, the priority level 503. The performance mapper 502 may include a table or other data structure that receives, as one or more inputs, one or more of the operating conditions 501 and the latency requirement 505. The table may include a lookup table, which outputs, based on one or more of the inputs, the priority level 503. The performance mapper 502 may perform machine learning with respect to the lookup table to develop the lookup table over time. As discussed above, the performance mapper 502 may output the priority level 503 to the buffer control unit 512.

As shown in the example of FIG. 5, the buffer control unit 512 may include a parameter mapping unit 700 and an adaptive partitioning unit 702. The parameter mapping unit 700 may represent a unit configured to map the priority level 503 to one or more parameters 701. The parameters 701 may include a number of spherical basis function orders to which the background audio signals correspond and a number of foreground audio signals to consider. The parameter mapping unit 701 may output the parameters as indications 513 to the adaptive partitioning unit 702 (and although not shown in the example of FIG. 5, to the mux control unit 504, the AptX™ decoder 510, and the ATF metadata decoder 508).

The adaptive partitioning unit 702 may represent a unit that configures the buffer 514 to perform adaptive partitioning (or, in other words, segmentation of) the transport channels 517 according to the parameters 513. As such, various aspects of the techniques may be performed during parsing of the bitstream 131 prior to AptX™ decoding, after AptX™ decoding, or some combination thereof.

With respect to the latency requirement 505, the buffer control unit 512 may configure the buffer 514 to reduce latency in order to meet the latency requirement 505. To reduce latency, the buffer control unit 512 may reduce a size of the buffer 514, which may result in only buffering the low ambisonic orders (or, in other words, reduce the number of signals to decode/render). The latency requirement 505 may promote applications where lower latency is required, such as in the context of virtual reality (or other types of extended reality, such as augmented reality or mixed reality) involving a head mounted display. In some instances, the audio decoder 132 may perform time scaling for seamless transition from high-latency to low-latency.

Figure 6:
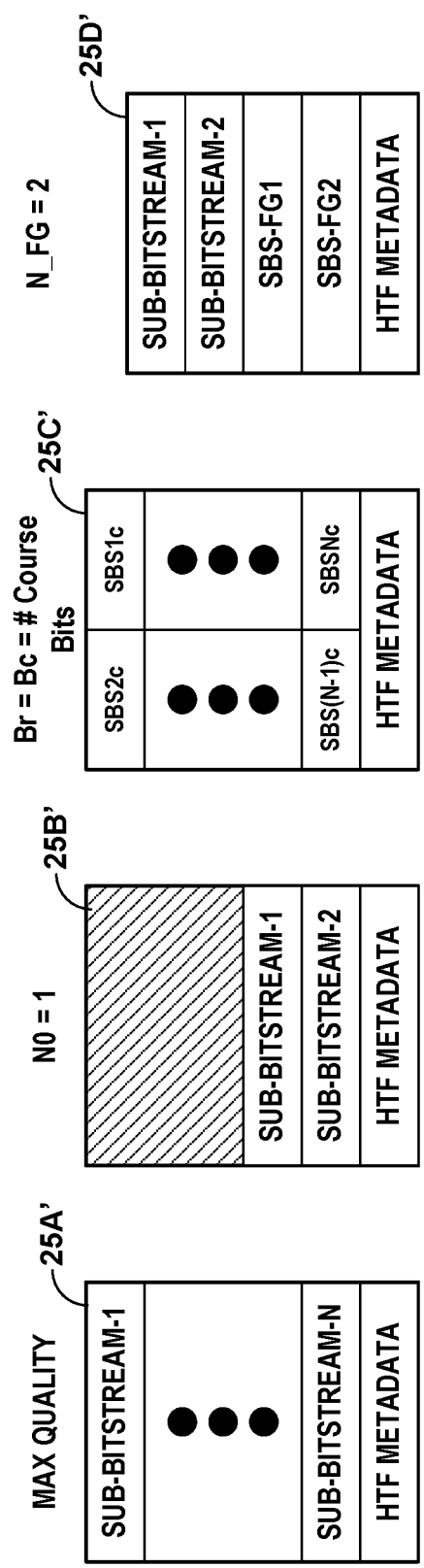
FIG. 6 is a block diagram illustrating different versions of the ATF audio data after undergoing processing by the audio decoder in accordance with various aspects of the techniques.

FIG. 6 is a block diagram illustrating different versions of the ATF audio data after undergoing processing by the audio decoder in accordance with various aspects of the techniques. In the example of FIG. 6, ATF audio data 25A' represents a version of ATF audio data 25' that is at full or max quality, where the audio decoder 132 decodes all of the bits of every sub-bitstream 509. ATF audio data 25B' represents a version of the ATF audio data 25' in which the audio decoder 132 decodes only the ambisonic coefficients corresponding to a spherical basis function of a first order and below. ATF audio data 25C' represents a version of the ATF audio data 25' in which the audio decoder 132 only decodes a subset of bits (e.g., the course bits for the energy), but decodes all of the sub-bitstreams 509 (which are denoted by "SBS1c" through "SBSNc"). ATF audio data 25D' represents a version of the ATF audio data 25' in which the audio decoder 132 decodes only two of three or more foreground audio signals.

Figure 7:
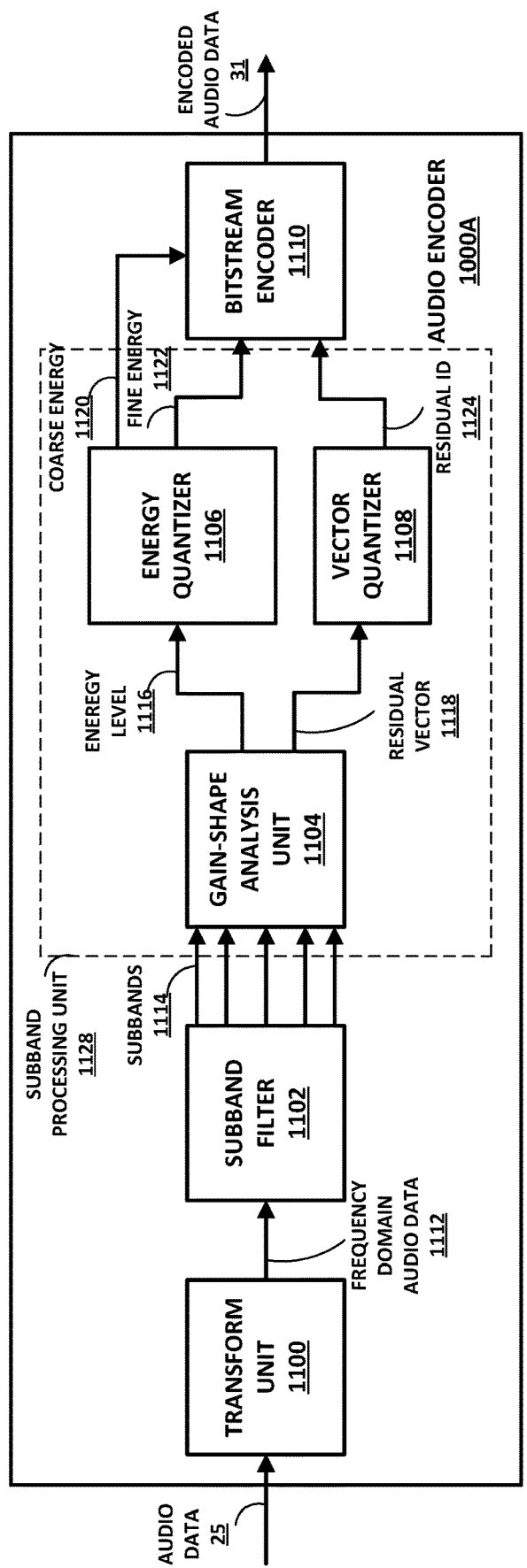
FIG. 7 is a block diagram illustrating an example of the psychoacoustic audio encoder of FIG. 2 configured to perform various aspects of the techniques described in this disclosure.

FIG. 7 is a block diagram illustrating an example of the psychoacoustic audio encoder of FIG. 2 configured to perform various aspects of the techniques described in this disclosure. The audio encoder 1000A may represent one example of the PAED 126, which may be configured to encode audio data for transmission over a personal area network or "PAN" (e.g., Bluetooth®). However, the techniques of this disclosure performed by the audio encoder 1000A may be used in any context where the compression of audio data is desired. In some examples, the audio encoder 1000A may be configured to encode the audio data 17 in accordance with as aptX™ audio codec, including, e.g., enhanced aptX™—E-aptX™, aptX Live™, and aptX high definition (aptX-HD™).

In the example of FIG. 7, the audio encoder 1000A may be configured to encode the audio data 25 using a gain-shape vector quantization encoding process that includes coding residual vector using compact maps. In a gain-shape vector quantization encoding process, the audio encoder 1000A is configured to encode both a gain (e.g., an energy level) and a shape (e.g., a residual vector defined by transform coefficients) of a subband of frequency domain audio data. Each subband of frequency domain audio data represents a certain frequency range of a particular frame of the audio data 25.

The audio data 25 may be sampled at a particular sampling frequency. Example sampling frequencies may include 48 kHz or 44.1 kHZ, though any desired sampling frequency may be used. Each digital sample of the audio data 25 may be defined by a particular input bit depth, e.g., 16 bits or 24 bits. In one example, the audio encoder 1000A may be configured operate on a single channel of the audio data 21 (e.g., mono audio). In another example, the audio encoder 1000A may be configured to independently encode two or more channels of the audio data 25. For example, the audio data 17 may include left and right channels for stereo audio. In this example, the audio encoder 1000A may be configured to encode the left and right audio channels independently in a dual mono mode. In other examples, the audio encoder 1000A may be configured to encode two or more channels of the audio data 25 together (e.g., in a joint stereo mode). For example, the audio encoder 1000A may perform certain compression operations by predicting one channel of the audio data 25 with another channel of the audio data 25.

Regardless of how the channels of the audio data 25 are arranged, the audio encoder 1000A obtains the audio data 25 and sends that audio data 25 to a transform unit 1100. The transform unit 1100 is configured to transform a frame of the audio data 25 from the time domain to the frequency domain to produce frequency domain audio data 1112. A frame of the audio data 25 may be represented by a predetermined number of samples of the audio data. In one example, a frame of the audio data 25 may be 1024 samples wide. Different frame widths may be chosen based on the frequency transform being used and the amount of compression desired. The frequency domain audio data 1112 may be represented as transform coefficients, where the value of each the transform coefficients represents an energy of the frequency domain audio data 1112 at a particular frequency.

In one example, the transform unit 1100 may be configured to transform the audio data 25 into the frequency domain audio data 1112 using a modified discrete cosine transform (MDCT). An MDCT is a "lapped" transform that is based on a type-IV discrete cosine transform. The MDCT is considered "lapped" as it works on data from multiple frames. That is, in order to perform the transform using an MDCT, transform unit 1100 may include a fifty percent overlap window into a subsequent frame of audio data. The overlapped nature of an MDCT may be useful for data compression techniques, such as audio encoding, as it may reduce artifacts from coding at frame boundaries. The transform unit 1100 need not be constrained to using an MDCT but may use other frequency domain transformation techniques for transforming the audio data 17 into the frequency domain audio data 1112.

A subband filter 1102 separates the frequency domain audio data 1112 into subbands 1114. Each of the subbands 1114 includes transform coefficients of the frequency domain audio data 1112 in a particular frequency range. For instance, the subband filter 1102 may separate the frequency domain audio data 1112 into twenty different subbands. In some examples, subband filter 1102 may be configured to separate the frequency domain audio data 1112 into subbands 1114 of uniform frequency ranges. In other examples, subband filter 1102 may be configured to separate the frequency domain audio data 1112 into subbands 1114 of non-uniform frequency ranges.

For example, subband filter 1102 may be configured to separate the frequency domain audio data 1112 into subbands 1114 according to the Bark scale. In general, the subbands of a Bark scale have frequency ranges that are perceptually equal distances. That is, the subbands of the Bark scale are not equal in terms of frequency range, but rather, are equal in terms of human aural perception. In general, subbands at the lower frequencies will have fewer transform coefficients, as lower frequencies are easier to perceive by the human aural system. As such, the frequency domain audio data 1112 in lower frequency subbands of the subbands 1114 is less compressed by the audio encoder 1000A, as compared to higher frequency subbands. Likewise, higher frequency subbands of the subbands 1114 may include more transform coefficients, as higher frequencies are harder to perceive by the human aural system. As such, the frequency domain audio 1112 in data in higher frequency subbands of the subbands 1114 may be more compressed by the audio encoder 1000A, as compared to lower frequency subbands.

The audio encoder 1000A may be configured to process each of subbands 1114 using a subband processing unit 1128. That is, the subband processing unit 1128 may be configured to process each of subbands separately. The subband processing unit 1128 may be configured to perform a gain-shape vector quantization process with extended-range coarse-fine quantization in accordance with techniques of this disclosure.

A gain-shape analysis unit 1104 may receive the subbands 1114 as an input. For each of subbands 1114, the gain-shape analysis unit 1104 may determine an energy level 1116 of each of the subbands 1114. That is, each of subbands 1114 has an associated energy level 1116. The energy level 1116 is a scalar value in units of decibels (dBs) that represents the total amount of energy (also called gain) in the transform coefficients of a particular one of subbands 1114. The gain-shape analysis unit 1104 may separate energy level 1116 for one of subbands 1114 from the transform coefficients of the subbands to produce residual vector 1118. The residual vector 1118 represents the so-called "shape" of the subband. The shape of the subband may also be referred to as the spectrum of the subband.

A vector quantizer 1108 may be configured to quantize the residual vector 1118. In one example, the vector quantizer 1108 may quantize the residual vector using a quantization process to produce the residual ID 1124. Instead of quantizing each sample separately (e.g., scalar quantization), the vector quantizer 1108 may be configured to quantize a block of samples included in the residual vector 1118 (e.g., a shape vector). Any vector quantization techniques method can be used along with the extended-range coarse-fine energy quantization processes.

In some examples, the audio encoder 1000A may dynamically allocate bits for coding the energy level 1116 and the residual vector 1118. That is, for each of subbands 1114, the audio encoder 1000A may determine the number of bits allocated for energy quantization (e.g., by the energy quantizer 1106) and the number of bits allocated for vector quantization (e.g., by the vector quantizer 1108). The total number of bits allocated for energy quantization may be referred to as energy-assigned bits. These energy-assigned bits may then be allocated between a coarse quantization process and a fine quantization process.

An energy quantizer 1106 may receive the energy level 1116 of the subbands 1114 and quantize the energy level 1116 of the subbands 1114 into a coarse energy 1120 and a fine energy 1122 (which may represent one or more quantized fine residuals). This disclosure will describe the quantization process for one subband, but it should be understood that the energy quantizer 1106 may perform energy quantization on one or more of the subbands 1114, including each of the subbands 1114.

In general, the energy quantizer 1106 may perform a recursive two-step quantization process. Energy quantizer 1106 may first quantize the energy level 1116 with a first number of bits for a coarse quantization process to generate the coarse energy 1120. The energy quantizer 1106 may generate the coarse energy using a predetermined range of energy levels for the quantization (e.g., the range defined by a maximum and a minimum energy level. The coarse energy 1120 approximates the value of the energy level 1116.

The energy quantizer 1106 may then determine a difference between the coarse energy 1120 and the energy level 1116. This difference is sometimes called a quantization error. The energy quantizer 1106 may then quantize the quantization error using a second number of bits in a fine quantization process to produce the fine energy 1122. The number of bits used for the fine quantization bits is determined by the total number of energy-assigned bits minus the number of bits used for the coarse quantization process. When added together, the coarse energy 1120 and the fine energy 1122 represent a total quantized value of the energy level 1116. The energy quantizer 1106 may continue in this manner to produce one or more fine energies 1122.

The audio encoder 1000A may be further configured to encode the coarse energy 1120, the fine energy 1122, and the residual ID 1124 using a bitstream encoder 1110 to create the encoded audio data 31 (which is another way to refer to the bitstream 31). The bitstream encoder 1110 may be configured to further compress the coarse energy 1120, the fine energy 1122, and the residual ID 1124 using one or more entropy encoding processes. Entropy encoding processes may include Huffman coding, arithmetic coding, context-adaptive binary arithmetic coding (CABAC), and other similar encoding techniques.

In one example of the disclosure, the quantization performed by the energy quantizer 1106 is a uniform quantization. That is, the step sizes (also called "resolution") of each quantization are equal. In some examples, the steps sizes may be in units of decibels (dBs). The step size for the coarse quantization and the fine quantization may be determined, respectively, from a predetermined range of energy values for the quantization and the number of bits allocated for the quantization. In one example, the energy quantizer 1106 performs uniform quantization for both coarse quantization (e.g., to produce the coarse energy 1120) and fine quantization (e.g., to produce the fine energy 1122).

Performing a two-step, uniform quantization process is equivalent to performing a single uniform quantization process. However, by splitting the uniform quantization into two parts, the bits allocated to coarse quantization and fine quantization may be independently controlled. This may allow for more flexibility in the allocation of bits across energy and vector quantization and may improve compression efficiency. Consider an M-level uniform quantizer, where M defines the number of levels (e.g., in dB) into which the energy level may be divided. M may be determined by the number of bits allocated for the quantization. For example, the energy quantizer 1106 may use M1 levels for coarse quantization and M2 levels for fine quantization. This equivalent to a single uniform quantizer using M1*M2 levels.

Figure 8:
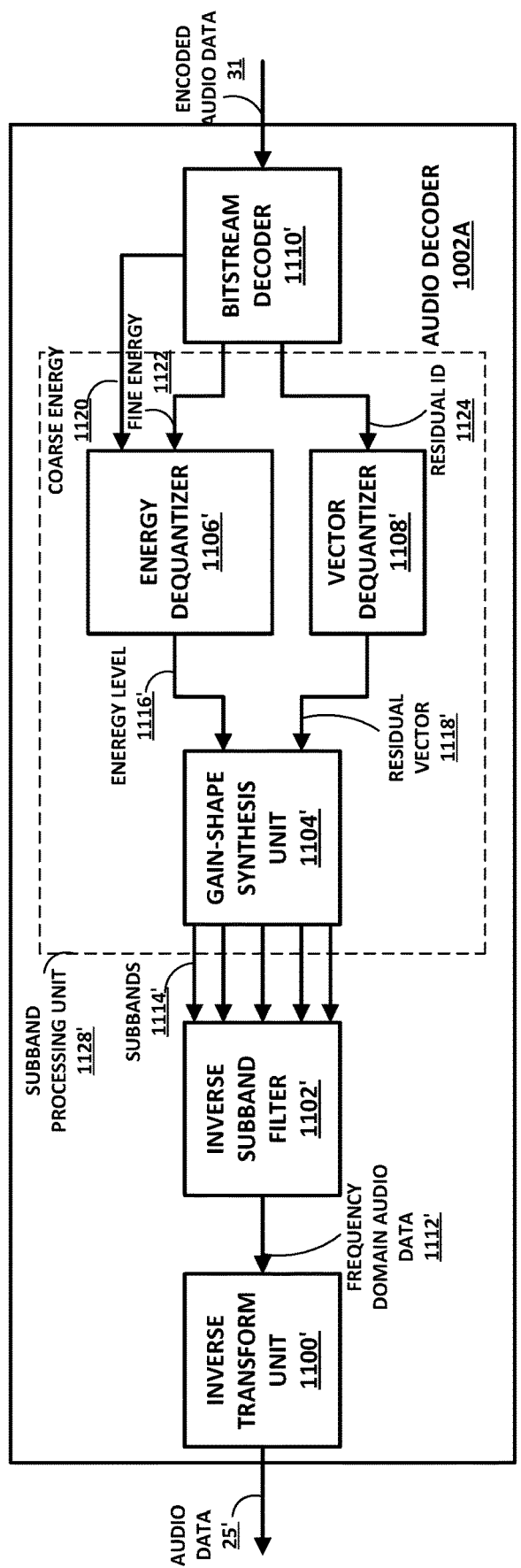
FIG. 8 is a block diagram illustrating an implementation of the psychoacoustic audio decoder of FIGS. 1-3B in more detail.

FIG. 8 is a block diagram illustrating an implementation of the psychoacoustic audio decoder of FIGS. 1-3 in more detail. The audio decoder 1002A may represent one example of the AptX™ decoders 510, which may be configured to decode audio data received over a PAN (e.g., Bluetooth®). However, the techniques of this disclosure performed by the audio decoder 1002A may be used in any context where the compression of audio data is desired. In some examples, the audio decoder 1002A may be configured to decode the audio data 21 in accordance with as aptX™ audio codec, including, e.g., enhanced aptX™—E-aptX™, aptX Live™, and aptX high Definition™. However, the techniques of this disclosure may be used in any audio codec configured to perform quantization of audio data. The audio decoder 1002A may be configured to perform various aspects of a quantization process using compact maps in accordance with techniques of this disclosure.

In general, the audio decoder 1002A may operate in a reciprocal manner with respect to audio encoder 1000A. As such, the same process used in the encoder for quality/bitrate scalable cooperative PVQ can be used in the audio decoder 1002A. The decoding is based on the same principals, with inverse of the operations conducted in the decoder, so that audio data can be reconstructed from the encoded bitstream received from encoder. Each quantizer has an associated dequantizer counterpart. For example, as shown in FIG. 8, inverse transform unit 1100', inverse subband filter 1102', gain-shape synthesis unit 1104', energy dequantizer 1106', vector dequantizer 1108', and bitstream decoder 1110' may be respectively configured to perform inverse operations with respect to transform unit 1100, subband filter 1102, gain-shape analysis unit 1104, energy quantizer 1106, vector quantizer 1108, and bitstream encoder 1110 of FIG. 7.

In particular, the gain-shape synthesis unit 1104' reconstructs the frequency domain audio data, having the reconstructed residual vectors along with the reconstructed energy levels. The inverse subband filter 1102' and the inverse transform unit 1100' output the reconstructed audio data 25'. In examples where the encoding is lossless, the reconstructed audio data 25' may perfectly match the audio data 25. In examples where the encoding is lossy, the reconstructed audio data 25' may not perfectly match the audio data 25.

Figure 9A:
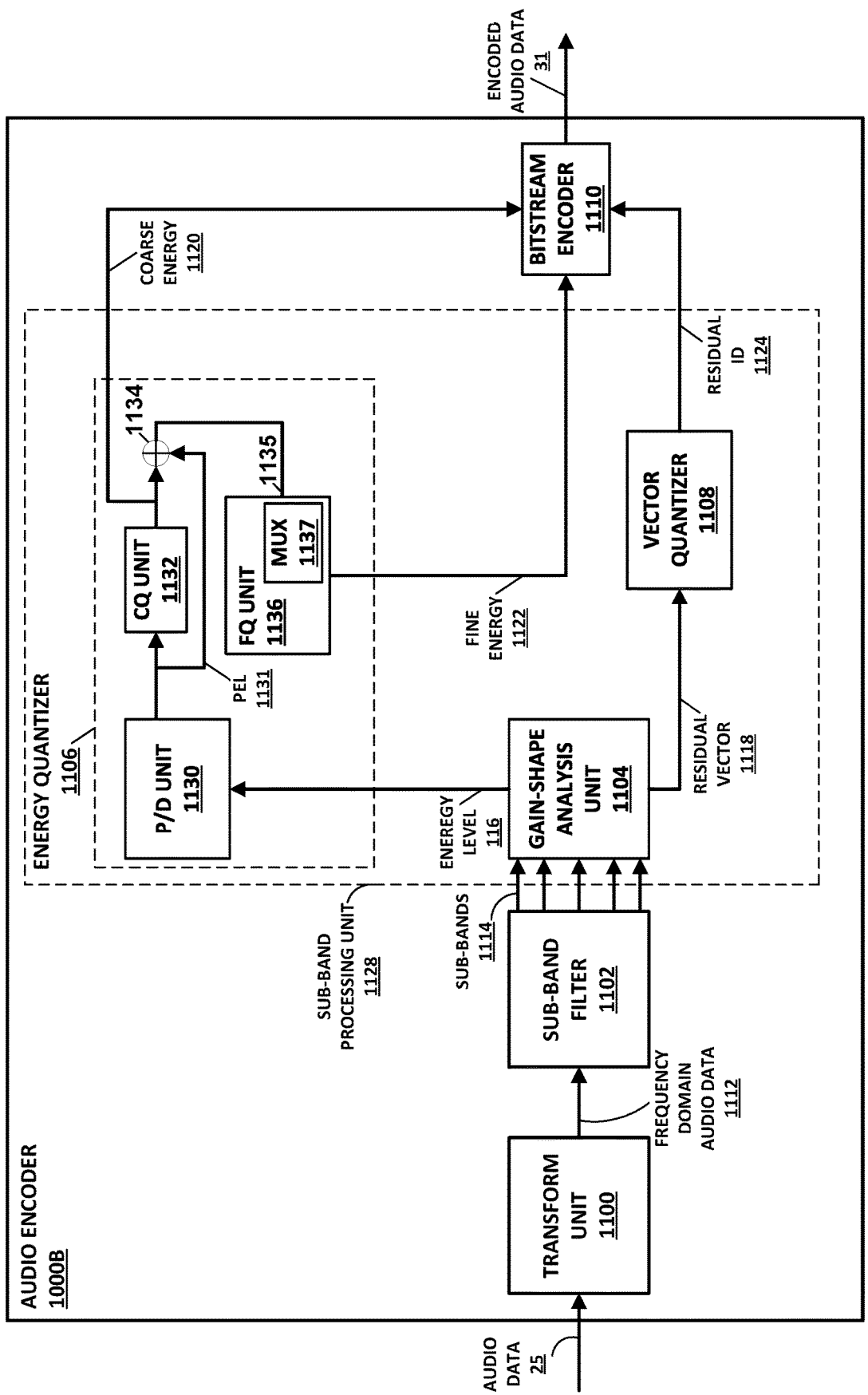
FIGS. 9A and 9B are block diagrams illustrating additional examples of the psychoacoustic audio encoder shown in the examples of FIGS. 1-3B in more detail.
Figure 9B:
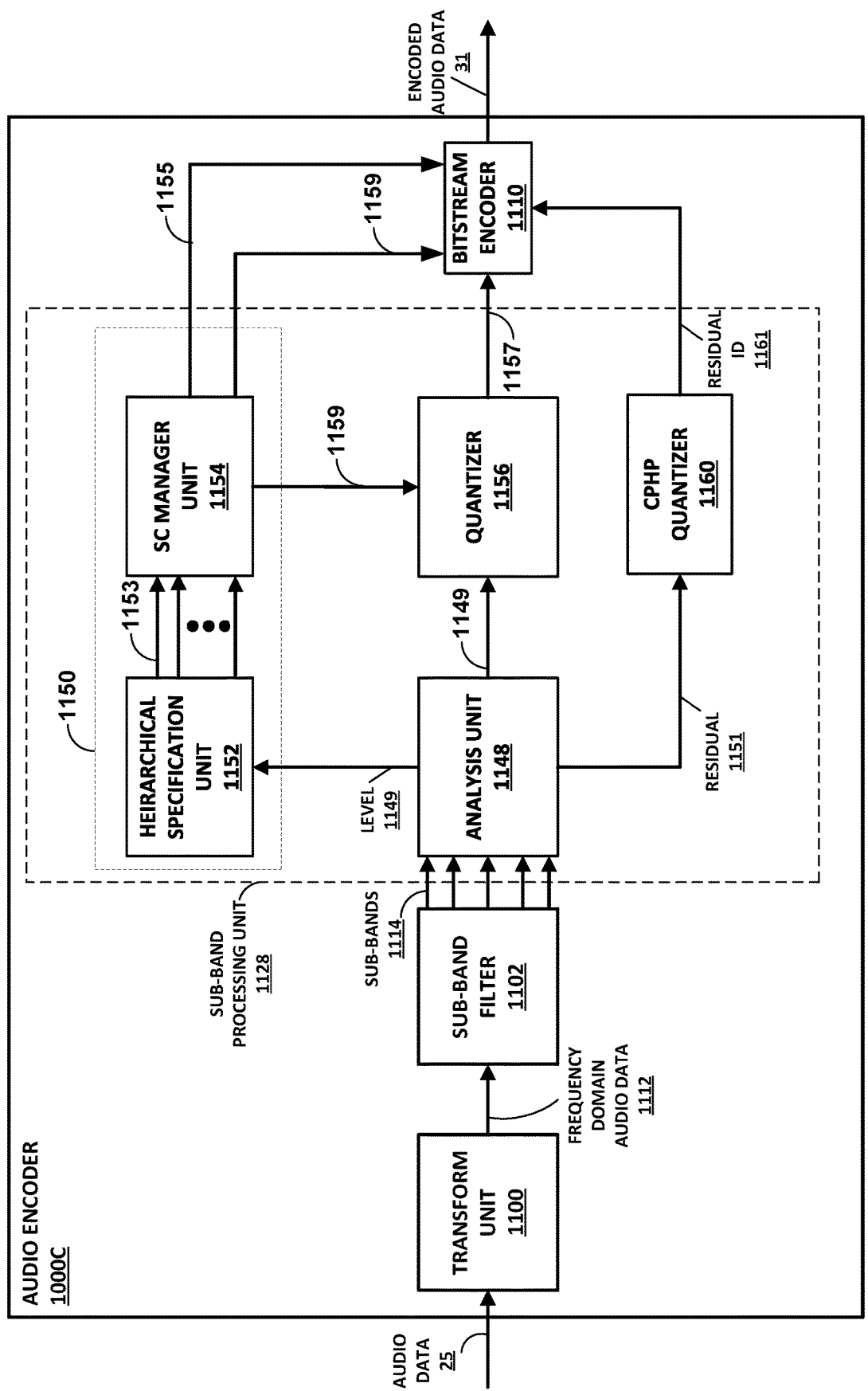

FIGS. 9A and 9B are block diagrams illustrating additional examples of the psychoacoustic audio encoder shown in the examples of FIGS. 1-3B in more detail. Referring first to the example of FIG. 9A, the audio encoder 1000B may be configured to encode audio data for transmission over a PAN (e.g., Bluetooth®). However, again, the techniques of this disclosure performed by the audio encoder 1000B may be used in any context where the compression of audio data is desired. In some examples, the audio encoder 1000B may be configured to encode the audio data 25 in accordance with as aptX™ audio codec, including, e.g., enhanced aptX™—

E-aptX™, aptX Live™, and aptX high Definition™. However, the techniques of this disclosure may be used in any audio codec. As will be explained in more detail below, the audio encoder 1000B may be configured to perform various aspects of perceptual audio coding in accordance with various aspects of the techniques described in this disclosure.

In the example of FIG. 9A, the audio encoder 1000B may be configured to encode the audio data 25 using a gain-shape vector quantization encoding process. In a gain-shape vector quantization encoding process, the audio encoder 1000B is configured to encode both a gain (e.g., an energy level) and a shape (e.g., a residual vector defined by transform coefficients) of a sub-band of frequency domain audio data. Each sub-band of frequency domain audio data represents a certain frequency range of a particular frame of the audio data 25. In general, throughout this disclosure, the term "sub-band" represents a frequency range, a band, or the like.

The audio encoder 1000B invokes a transform unit 1100 to process the audio data 25. The transform unit 1100 is configured to process the audio data 25 by, at least in part, applying a transform to a frame of the audio data 25 and thereby transform the audio data 25 from a time domain to a frequency domain to produce frequency domain audio data 1112.

A frame of the audio data 25 may be represented by a predetermined number of samples of the audio data. In one example, a frame of the audio data 25 may be 1024 samples wide. Different frame widths may be chosen based on the frequency transform being used and the amount of compression desired. The frequency domain audio data 1112 may be represented as transform coefficients, where the value of each the transform coefficients represents an energy of the frequency domain audio data 1112 at a particular frequency.

In one example, the transform unit 1100 may be configured to transform the audio data 25 into the frequency domain audio data 1112 using a modified discrete cosine transform (MDCT). An MDCT is a "lapped" transform that is based on a type-IV discrete cosine transform. The MDCT is considered "lapped" as it works on data from multiple frames. That is, in order to perform the transform using an MDCT, transform unit 1100 may include a fifty percent overlap window into a subsequent frame of audio data. The overlapped nature of an MDCT may be useful for data compression techniques, such as audio encoding, as it may reduce artifacts from coding at frame boundaries. The transform unit 1100 need not be constrained to using an MDCT but may use other frequency domain transformation techniques for transforming the audio data 25 into the frequency domain audio data 1112.

A sub-band filter 1102 separates the frequency domain audio data 1112 into sub-bands 1114. Each of the sub-bands 1114 includes transform coefficients of the frequency domain audio data 1112 in a particular frequency range. For instance, the sub-band filter 1102 may separate the frequency domain audio data 1112 into twenty different sub-bands. In some examples, sub-band filter 1102 may be configured to separate the frequency domain audio data 1112 into sub-bands 1114 of uniform frequency ranges. In other examples, sub-band filter 1102 may be configured to separate the frequency domain audio data 1112 into sub-bands 1114 of non-uniform frequency ranges.

For example, sub-band filter 1102 may be configured to separate the frequency domain audio data 1112 into sub-bands 1114 according to the Bark scale. In general, the sub-bands of a Bark scale have frequency ranges that are perceptually equal distances. That is, the sub-bands of the Bark scale are not equal in terms of frequency range, but rather, are equal in terms of human aural perception. In general, sub-bands at the lower frequencies will have fewer transform coefficients, as lower frequencies are easier to perceive by the human aural system.

As such, the frequency domain audio data 1112 in lower frequency sub-bands of the sub-bands 1114 is less compressed by the audio encoder 1000B, as compared to higher frequency sub-bands. Likewise, higher frequency sub-bands of the sub-bands 1114 may include more transform coefficients, as higher frequencies are harder to perceive by the human aural system. As such, the frequency domain audio 1112 in data in higher frequency sub-bands of the sub-bands 1114 may be more compressed by the audio encoder 1000B, as compared to lower frequency sub-bands.

The audio encoder 1000B may be configured to process each of sub-bands 1114 using a sub-band processing unit 1128. That is, the sub-band processing unit 1128 may be configured to process each of sub-bands separately. The sub-band processing unit 1128 may be configured to perform a gain-shape vector quantization process.

A gain-shape analysis unit 1104 may receive the sub-bands 1114 as an input. For each of sub-bands 1114, the gain-shape analysis unit 1104 may determine an energy level 1116 of each of the sub-bands 1114. That is, each of sub-bands 1114 has an associated energy level 1116. The energy level 1116 is a scalar value in units of decibels (dBs) that represents the total amount of energy (also called gain) in the transform coefficients of a particular one of sub-bands 1114. The gain-shape analysis unit 1104 may separate energy level 1116 for one of sub-bands 1114 from the transform coefficients of the sub-bands to produce residual vector 1118. The residual vector 1118 represents the so-called "shape" of the sub-band. The shape of the sub-band may also be referred to as the spectrum of the sub-band.

A vector quantizer 1108 may be configured to quantize the residual vector 1118. In one example, the vector quantizer 1108 may quantize the residual vector using a quantization process to produce the residual ID 1124. Instead of quantizing each sample separately (e.g., scalar quantization), the vector quantizer 1108 may be configured to quantize a block of samples included in the residual vector 1118 (e.g., a shape vector).

In some examples, the audio encoder 1000B may dynamically allocate bits for coding the energy level 1116 and the residual vector 1118. That is, for each of sub-bands 1114, the audio encoder 1000B may determine the number of bits allocated for energy quantization (e.g., by an energy quantizer 1106) and the number of bits allocated for vector quantization (e.g., by the vector quantizer 1108). The total number of bits allocated for energy quantization may be referred to as energy-assigned bits. These energy-assigned bits may then be allocated between a coarse quantization process and a fine quantization process.

An energy quantizer 1106 may receive the energy level 1116 of the sub-bands 1114 and quantize the energy level 1116 of the sub-bands 1114 into a coarse energy 1120 and a fine energy 1122. This disclosure will describe the quantization process for one sub-band, but it should be understood that the energy quantizer 1106 may perform energy quantization on one or more of the sub-bands 1114, including each of the sub-bands 1114.

As shown in the example of FIG. 9A, the energy quantizer 1106 may include a prediction/difference ("P/D") unit 1130, a coarse quantization ("CQ") unit 1132, a summation unit 1134, and a fine quantization ("FQ") unit 1136. The P/D unit 1130 may predict or otherwise identify a difference between energy levels 1116 for one of the sub-bands 1114 and another one of the sub-bands 1114 of the same frame of audio data (which may refer to spatial—in the frequency domain—prediction) or a same (or possibly a different) ones of the sub-bands 1114 from a different frame (which may be referred to as temporal prediction). The P/D unit 1130 may analyze the energy levels 1116 in this manner to obtain predicted energy levels 1131 ("PEL 1131") for each of the sub-bands 1114. The P/D unit 1130 may output the predicted energy levels 1131 to the coarse quantization unit 1132.

The coarse quantization unit 1132 may represent a unit configured to perform coarse quantization with respect to the predicted energy levels 1131 to obtain the coarse energy 1120. The coarse quantization unit 1132 may output the coarse energy 1120 to the bitstream encoder 1110 and the summation unit 1134. The summation unit 1134 may represent a unit configured to obtain a difference of the coarse quantization unit 1134 and the predicted energy level 1131. The summation unit 1134 may output the difference as error 1135 (which may also be referred to as "residual 1135") to the fine quantization unit 1135.

The fine quantization unit 1132 may represent a unit configured to perform fine quantization with respect to the error 1135. The fine quantization may be considered "fine" relative to the coarse quantization performed by the coarse quantization unit 1132. That is, the fine quantization unit 1132 may quantize according to a step size having a higher resolution than the step size used when performing the coarse quantization, thereby further quantizing the error 1135. The fine quantization unit 1136 may obtain a fine energy 1122 for each for the sub-bands 1122 as a result of performing the fine quantization with respect to the error 1135. The fine quantization unit 1136 may output the fine energy 1122 to the bitstream encoder 1110.

In general, the energy quantizer 1106 may perform a multi-step quantization process. The energy quantizer 1106 may first quantize the energy level 1116 with a first number of bits for a coarse quantization process to generate the coarse energy 1120. The energy quantizer 1106 may generate the coarse energy using a predetermined range of energy levels for the quantization (e.g., the range defined by a maximum and a minimum energy level. The coarse energy 1120 approximates the value of the energy level 1116.

The energy quantizer 1106 may then determine a difference between the coarse energy 1120 and the energy level 1116. This difference is sometimes called a quantization error (or, residual). The energy quantizer 1106 may then quantize the quantization error using a second number of bits in a fine quantization process to produce the fine energy 1122. The number of bits used for the fine quantization bits is determined by the total number of energy-assigned bits minus the number of bits used for the coarse quantization process. When added together, the coarse energy 1120 and the fine energy 1122 represent a total quantized value of the energy level 1116.

The audio encoder 1000B may be further configured to encode the coarse energy 1120, the fine energy 1122, and the residual ID 1124 using a bitstream encoder 1110 to create the encoded audio data 21. The bitstream encoder 1110 may be configured to further compress the coarse energy 1120, the fine energy 1122, and the residual ID 1124 using one or more of the above noted entropy encoding processes.

The energy quantizer 1106 (and/or components thereof, such as the fine quantization unit 1136) may, in accordance with aspects of this disclosure, implement a hierarchical rate control mechanism to provide a greater degree of scalability and to achieve a seamless or substantially seamless real-time streaming. For instance, the fine quantization unit 1136 may implement a hierarchical fine quantization scheme according to aspects of this disclosure. In some examples, the fine quantization unit 1136 invokes a multiplexer (or "MUX") 1137 to implement selection operations of the hierarchical rate control.

The term "coarse quantization" refers to the combined operations of the two-step coarse-fine quantization processes described above. In accordance with various aspects of this disclosure, the fine quantization unit 1136 may perform one or more additional iterations of fine quantization with respect to the error 1135 received from the summation unit 1134. The fine quantization unit 1136 may use the multiplexer 1137 to switch between and traverse various fine(r) energy levels.

The hierarchical rate control may refer to a tree-based fine quantization structure or a cascaded fine quantization structure. When viewed as a tree-based structure, the existing two-step quantization operation forms a root node of the tree, and the root node is described as having a resolution depth of one (1). Depending on availability of bits for further fine quantization in accordance with the techniques of this disclosure, the multiplexer 1137 may select additional level(s) of fine-grained quantization. Any such subsequent fine quantization levels selected by the multiplexer 1137 represent resolution depths of two (2), three (3), and so on, with respect to the tree-based structure that represents the multiple-level fine quantization techniques of this disclosure.

The fine quantization unit 1136 may provide improved scalability and control with respect to seamless real-time streaming scenarios in a wireless PAN. For instance, the fine quantization unit 1136 may replicate the hierarchical fine quantization scheme and quantization multiplexing tree at higher level hierarchies, seeded at coarse quantization points of a more general decision tree. Moreover, the fine quantization unit 1136 may enable the audio encoder 1000B to achieve seamless or substantially seamless real-time compression and streaming navigation. For instance, the fine quantization unit 1136 may perform a multiple-root hierarchical decision structure with respect to multiple-level fine quantization, thereby enabling the energy quantizer 1106 to utilize the total available bits to implement potentially several iterations of fine quantization.

The fine quantization unit 1136 may implement the hierarchical rate control processes in a variety of ways. The fine quantization unit 1136 may invoke the multiplexer 1137 on a per-sub-band basis to independently multiplex (and thereby select a respective tree-based quantization scheme) for error 1135 information pertaining to each one of the sub-bands 1114. That is, in these examples, the fine quantization unit 1136 performs a multiplexing-based hierarchical quantization mechanism selection for each respective sub-band 1114 independently of the quantization mechanism selection for any other ones of sub-bands 1114. In these examples, the fine quantization unit 1136 quantizes each of sub-bands 1114 according to a target bitrate specified with respect to the respective sub-band 1114 only. In these examples, the audio encoder 1000B may signal, as part of the encoded audio data 21, details of the particular hierarchical quantization scheme for each of the sub-bands 1114.

In other examples, the fine quantization unit 1136 may invoke the multiplexer 1137 just once, and thereby select a single multiplexing-based quantization scheme for the error 1135 information pertaining to all of sub-bands 1114. That is, in these examples, the fine quantization unit 1136 quantizes the error 1135 information pertaining to all of sub-bands 1114 according to the same target bitrate, which is selected a single time and defined uniformly for all of the sub-bands 1114. In these examples, the audio encoder 1000B may signal, as part of the encoded audio data 21, details of the single hierarchical quantization scheme applied across all of the sub-bands 1114.

Referring next to the example of FIG. 9B, audio encoder 1000C may represent another example of psychoacoustic audio encoding device 26 and/or 126 shown in the examples of FIGS. 1 and 2. The audio encoder 1000C is similar to the audio encoder 1000B shown in the example of FIG. 9A, except that the audio encoder 1000C includes a general analysis unit 1148 that may perform the gain-synthesis analysis or any other type of analysis to output level 1149 and residual 1151, a quantization controller unit 1150, a general quantizer 1156, and a cognitive/perceptual/hearing/psychoacoustic (CPHP) quantizer 1160.

The general analysis unit 1148 may receive sub-bands 1114 and perform any type of analysis to generate the levels 1149 and the residual 1151. The general analysis unit 1148 may output level 1149 to quantization controller unit 1150 and the residual 1151 to CPHP quantizer 1160.

Figure 11:
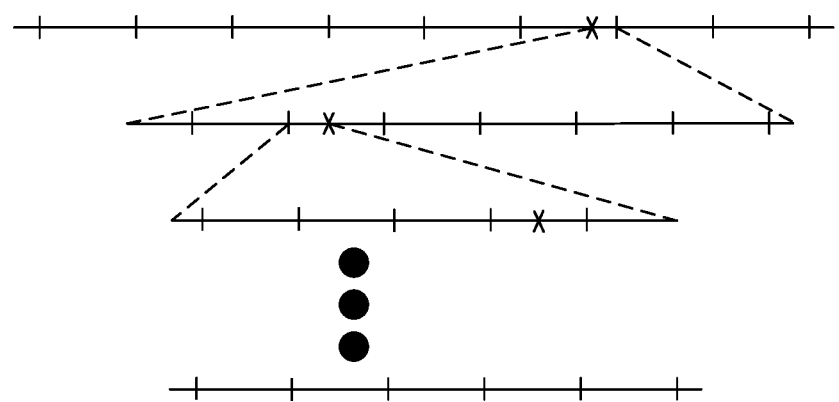
FIG. 11 is a diagram illustrating an example of top-down quantization.
Figure 12:
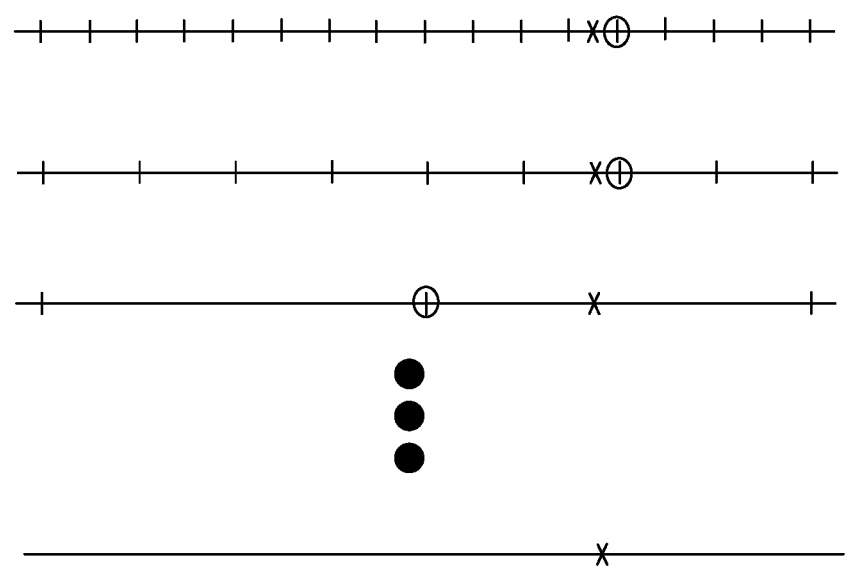
FIG. 12 is a diagram illustrating an example of bottom-up quantization.

The quantization controller unit 1150 may receive level 1149. As shown in the example of FIG. 9B, the quantization controller unit 1150 may include a hierarchical specification unit 1152 and a specification control (SC) manager unit 1154. The quantization controller unit 1150, responsive to receiving level 1149, may invoke the hierarchical specification unit 1152, which may perform either a top/down or bottom/up hierarchical specification. FIG. 11 is a diagram illustrating an example of top-down quantization. FIG. 12 is a diagram illustrating an example of bottom-up quantization. That is, the hierarchical specification unit 1152 may switch back and forth between course and fine quantization on a frame-by-frame basis to enable a re-quantization mechanism that could make any given quantization coarser or finer.

From a course state to a finer state, the transition may happen by re-quantizing the preceding quantization error. Alternatively, the quantization may occur such that neighboring quantization points are grouped together into a single quantization point (moving from the fine state to the course state). Such implementations may use sequential data structure, such as a linked list or more rich structures, such as a tree or graph. As such, the hierarchical specification unit 1152 may determine whether to switch from fine to course quantization or from course to fine quantization, providing the hierarchical space 1153 (which is the set of quantization points for the current frame) to the SC manager unit 1154. The hierarchical specification unit 1152 may determine whether to switch between finer or courser quantization based on any information used to perform the fine or course quantization specified above (e.g., a temporal or spatial priority information).

The SC manager unit 1154 may receive the hierarchical space 1153 and generate specification metadata 1155, passing an indication 1159 of the hierarchical space 1153 to bitstream encoder 1110 along with the specification metadata 1155. SC manager unit 1154 may also output the hierarchical specification 1159 to the quantizer 1156, which may perform quantization according to the hierarchical space 1159 with respect to level 1149 to obtain quantized level 1157. The quantizer 1156 may output quantized level 1157 to the bitstream encoder 1110, which may operate as described above to form the encoded audio data 31.

The CPHP quantizer 1160 may perform one or more of cognitive, perceptual, hearing, psychoacoustic encoding with respect to residual 1151 to obtain a residual ID 1161. The CPHP quantizer 1160 may output residual ID 1161 to bitstream encoder 1110, which may operate as described above to form the encoded audio data 31.

Figure 10A:
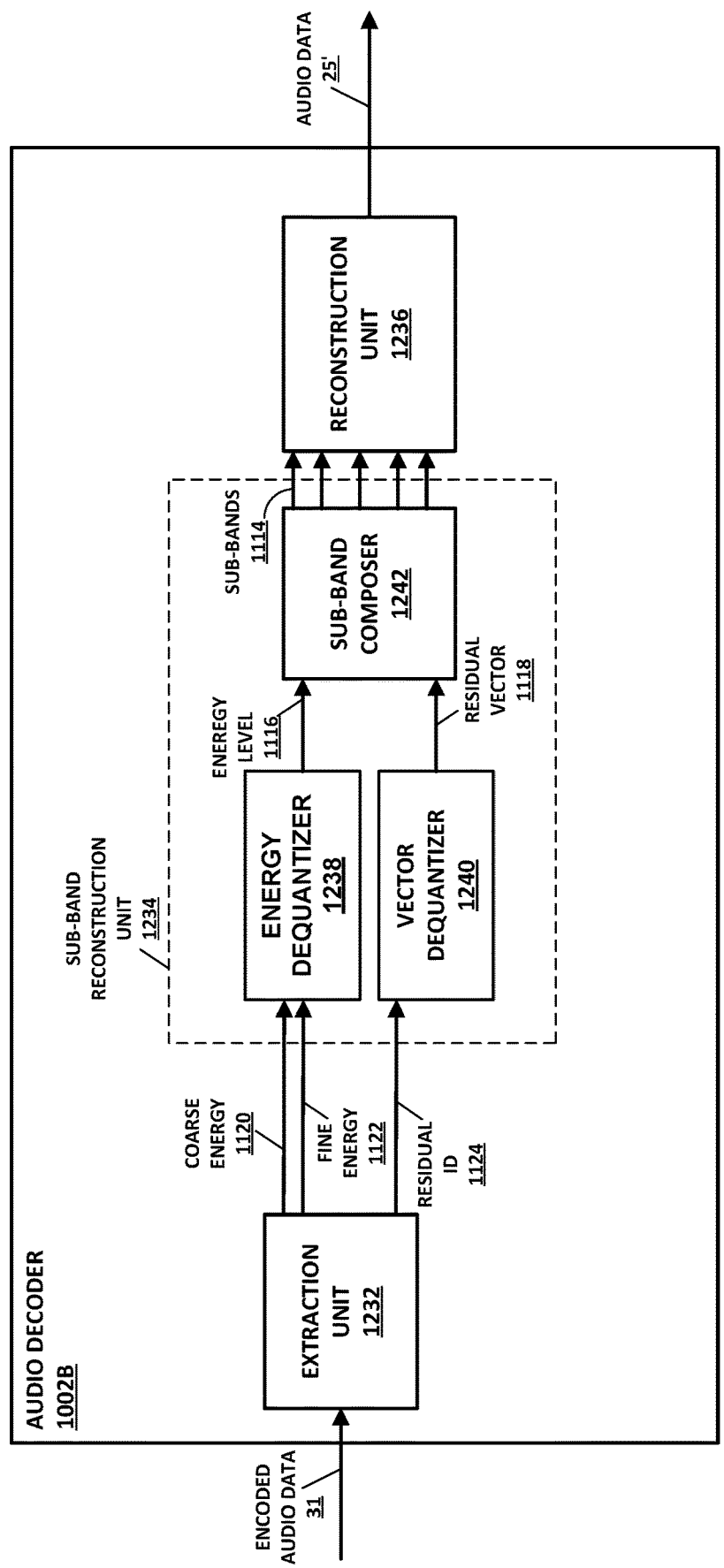
FIGS. 10A and 10B are block diagrams illustrating additional examples of the psychoacoustic audio decoder of FIGS. 1-3B in more detail.
Figure 10B:
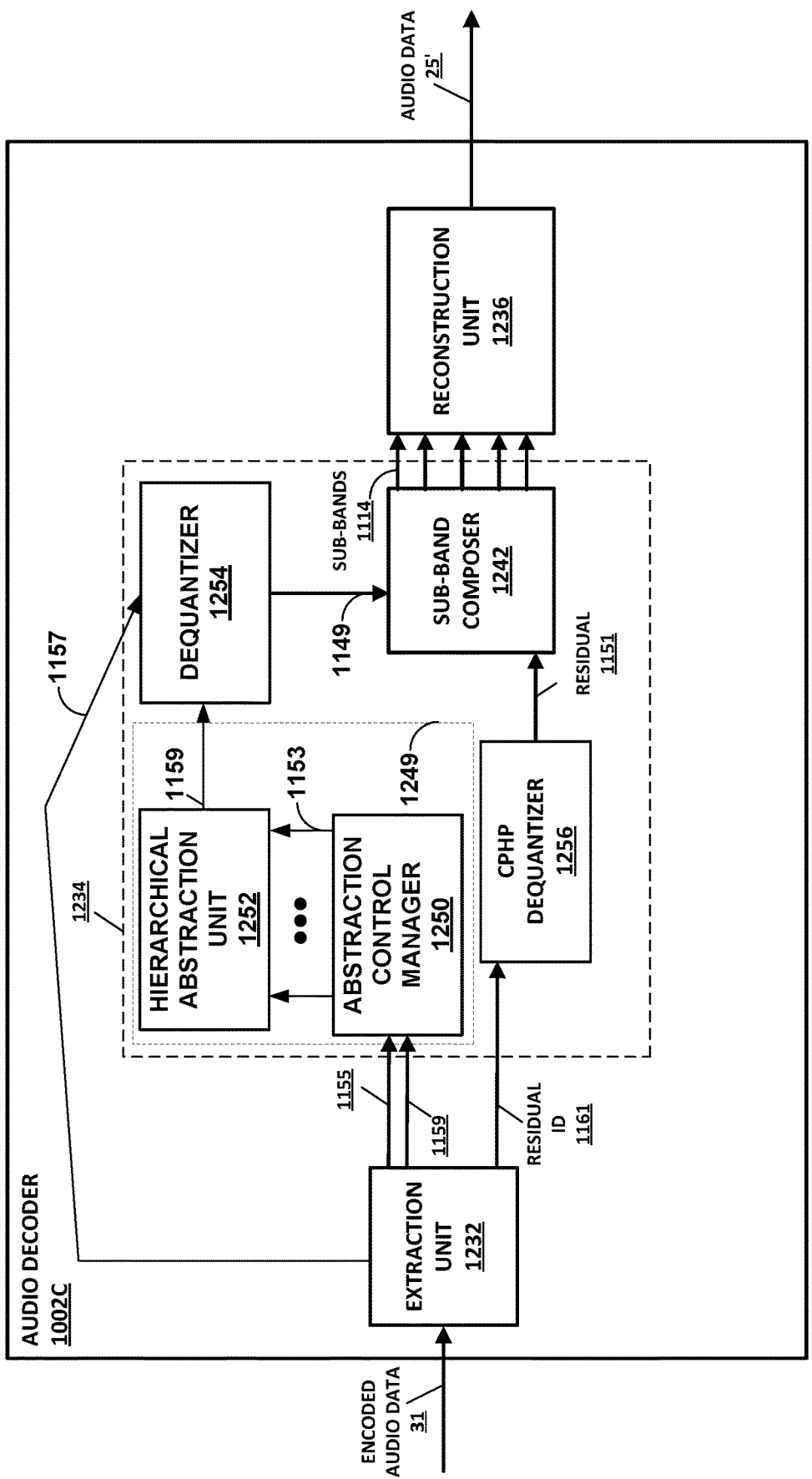

FIGS. 10A and 10B are block diagrams illustrating additional examples of the psychoacoustic audio decoder of FIGS. 1-3B in more detail. In the example of FIG. 10A, the audio decoder 1002B represents another example of the AptX™ decoders 510 shown in the examples of FIG. 3A. The audio decoder 1002B includes an extraction unit 1232, a sub-band reconstruction unit 1234, and a reconstruction unit 1236. The extraction unit 1232 may represent a unit configured to extract the coarse energy 1120, the fine energy 1122, and the residual ID 1124 from the encoded audio data 31. The extraction unit 1232 may extract, based on the energy bit allocation 1203, one or more of the coarse energy 1120, the fine energy 1122, and the residual ID 1124. The extraction unit 1232 may output the coarse energy 1120, the fine energy 1122 and the residual ID 1124 to the sub-band reconstruction unit 1234.

The sub-band reconstruction unit 1234 may represent a unit configured to operate in a manner that is reciprocal to the operation of the sub-band processing unit 1128 of the audio encoder 1000B shown in the example of FIG. 9A. The sub-band reconstruction unit 1234 may, in other words, reconstruct the sub-bands from the coarse energy 1120, the fine energy 1122, and the residual ID 1124. The sub-band reconstruction unit 1234 may include an energy dequantizer 1238, a vector dequantizer 1240, and a sub-band composer 1242.

The energy dequantizer 1238 may represent a unit configured to perform dequantization in a manner reciprocal to the quantization performed by the energy quantizer 1106 illustrated in FIG. 9A. The energy dequantizer 1238 may perform dequantization with respect to the coarse energy 1122 and the fine energy 1122 to obtain the predicted/difference energy levels, which the energy dequantizer 1238 may perform inverse prediction or difference calculations to obtain the energy level 1116. The energy dequantizer 1238 may output the energy level 1116 to the sub-band composer 1242.

If the encoded audio data 31 includes a syntax element set to a value indicating that the fine energy 1122 was quantized hierarchically, then the energy dequantizer 1238 may hierarchically dequantize the fine energy 1122. In some examples, the encoded audio data 31 may include a syntax element that indicates whether the hierarchically-quantized fine energy 1122 was formed using the same hierarchical quantization structure across all of the sub-bands 1114, or a respective hierarchical quantization structure was determined individually with respect to each of the sub-bands 1114. Based on the value of the syntax element, the energy dequantizer 1238 may either apply the same hierarchical dequantization structure across all of the sub-bands 1114 as represented by the fine energy 1122, or may update the hierarchical dequantization structure on a per-sub-band basis when dequantizing the fine energy 1122.

The vector dequantizer 1240 may represent a unit configured to perform vector dequantization in a manner reciprocal to the vector quantization performed by the vector quantizer 1108. The vector dequantizer 1240 may perform vector dequantization with respect to the residual ID 1124 to obtain the residual vector 1118. The vector dequantizer 1240 may output the residual vector 1118 to the sub-band composer 1242.

The sub-band composer 1242 may represent a unit configured to operate in a manner reciprocal to the gain-shape analysis unit 1104. As such, the sub-band composer 1242 may perform inverse gain-shape analysis with respect to the energy level 1116 and the residual vector 1118 to obtain the sub-bands 1114. The sub-band composer 1242 may output the sub-bands 1114 to the reconstruction unit 1236.

The reconstruction unit 1236 may represent a unit configured to reconstruct, based on the sub-bands 1114, the audio data 25'. The reconstruction unit 1236 may, in other words, perform inverse sub-band filtering in a manner reciprocal to the sub-band filtering applied by the sub-band filter 1102 to obtain the frequency domain audio data 1112. The reconstruction unit 1236 may next perform an inverse transform in a manner reciprocal to the transform applied by the transform unit 1100 to obtain the audio data 25'.

Referring next to the example of FIG. 10B, audio decoder 1002C may represent one example of the psychoacoustic audio decoding device 34 and/or 134 shown in the examples of FIGS. 1 and/or 2. Moreover, the audio decoder 1002C may be similar to the audio decoder 1002B, except that the audio decoder 1002C may include abstraction control manager 1250, hierarchical abstraction unit 1252, dequantizer 1254 as well as CPHP dequantizer 1256.

Abstraction control manager 1250 and hierarchical abstraction unit 1252 may form a dequantizer controller 1249 that controls operation of dequantizer 1254, operating reciprocally to the quantizer controller 1150. As such, the abstraction control manager 1250 may operate reciprocally to SC manager unit 1154, receiving metadata 1155 and hierarchical specification 1159. The abstraction control manager 1250 processes the metadata 1155 and the hierarchical specification 1159 to obtain hierarchical space 1153, which the abstraction control manager 1250 outputs to the hierarchical abstraction unit 1252. The hierarchical abstraction unit 1252 may operate reciprocally to the hierarchical specification unit 1152, thereby processing the hierarchical space 1153 to output an indication 1159 of the hierarchical space 1153 to dequantizer 1254.

The dequantizer 1254 may operate reciprocally to the quantizer 1156, where the dequantizer 1254 may dequantize quantized levels 1157 using the indication 1159 of the hierarchical space 1153 to obtain dequantized levels 1149. The dequantizer 1254 may output the dequantized levels 1149 to the sub-band composer 1242.

The extraction unit 1232 may output the residual ID 1161 to CPHP dequantizer 1256, which may operate reciprocally to the CPHP quantizer 1160. The CPHP dequantizer 1256 may process the residual ID 1161 to dequantize the residual ID 1161 and obtain residual 1161. The CPHP dequantizer 1256 may output the residual to sub-band composer 1242, which may process the residual 1151 and the dequantized levels 1254 to output sub-bands 1114. The reconstruction unit 1236 may operate as described above to convert the sub-bands 1114 into audio data 25' by applying an inverse subband filter with respect to the sub-bands 1114 and then applying an inverse transform to the output of the inverse subband filter.

Figure 13:
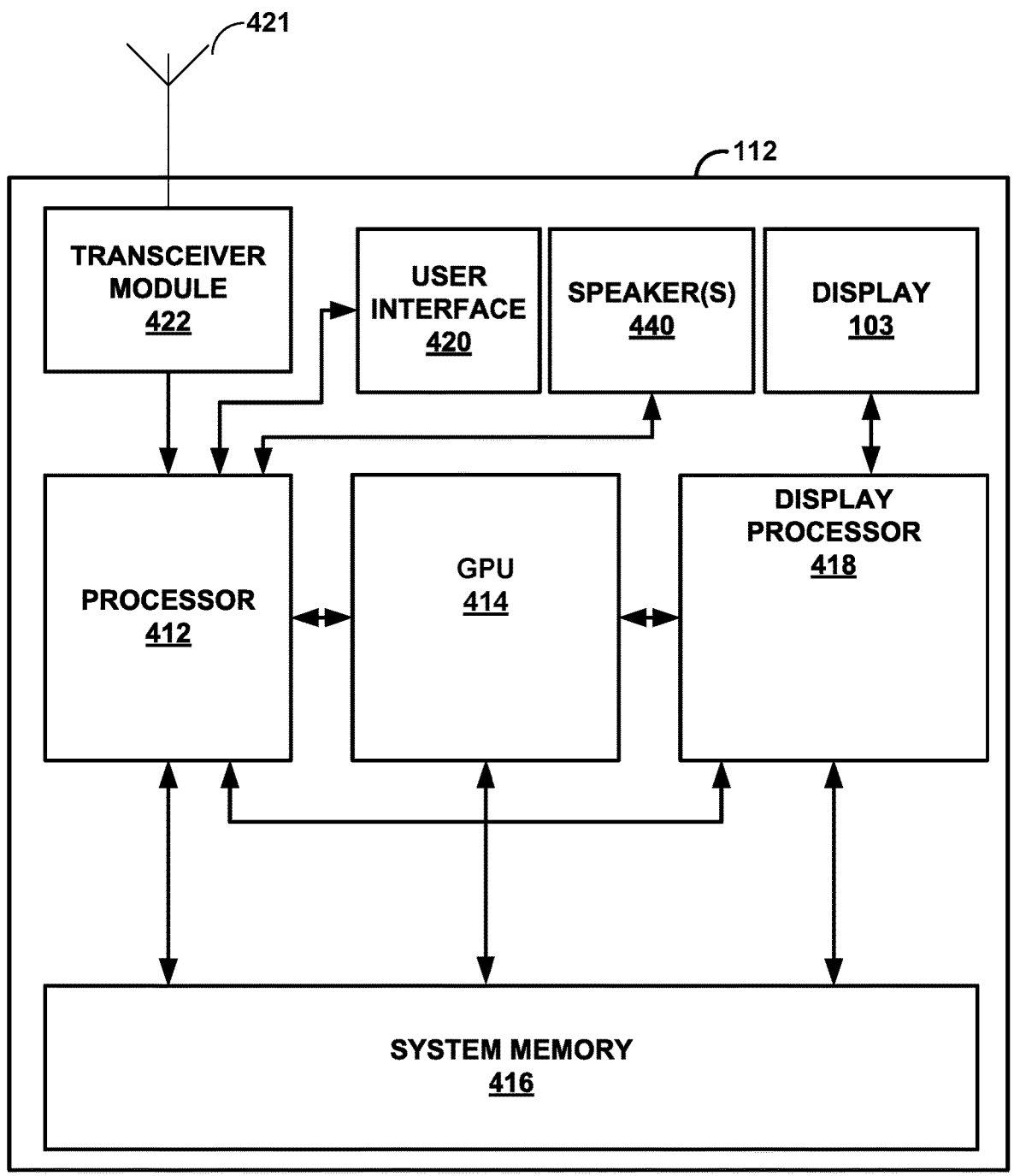
FIG. 13 is a block diagram illustrating example components of the source device shown in the example of FIG. 2.

FIG. 13 is a block diagram illustrating example components of the source device shown in the example of FIG. 2. In the example of FIG. 13, the source device 112 includes a processor 412 (which may be referred to as "one or more processors" or "processor(s)"), a graphics processing unit (GPU) 414, system memory 416, a display processor 418, one or more integrated speakers 140, a display 103, a user interface 420, antenna 421, and a transceiver module 422. In examples where the source device 112 is a mobile device, the display processor 418 is a mobile display processor (MDP). In some examples, such as examples where the source device 112 is a mobile device, the processor 412, the GPU 414, and the display processor 418 may be formed as an integrated circuit (IC).

For example, the IC may be considered as a processing chip within a chip package and may be a system-on-chip (SoC). In some examples, two of the processors 412, the GPU 414, and the display processor 418 may be housed together in the same IC and the other in a different integrated circuit (i.e., different chip packages) or all three may be housed in different ICs or on the same IC. However, it may be possible that the processor 412, the GPU 414, and the display processor 418 are all housed in different integrated circuits in examples where the source device 12 is a mobile device.

Examples of the processor 412, the GPU 414, and the display processor 418 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 412 may be the central processing unit (CPU) of the source device 12. In some examples, the GPU 414 may be specialized hardware that includes integrated and/or discrete logic circuitry that provides the GPU 414 with massive parallel processing capabilities suitable for graphics processing. In some instances, GPU 414 may also include general purpose processing capabilities, and may be referred to as a general-purpose GPU (GPGPU) when implementing general purpose processing tasks (i.e., non-graphics related tasks). The display processor 418 may also be specialized integrated circuit hardware that is designed to retrieve image content from the system memory 416, compose the image content into an image frame, and output the image frame to the display 103.

The processor 412 may execute various types of the applications 20. Examples of the applications 20 include web browsers, e-mail applications, spreadsheets, video games, other applications that generate viewable objects for display, or any of the application types listed in more detail above. The system memory 416 may store instructions for execution of the applications 20. The execution of one of the applications 20 on the processor 412 causes the processor 412 to produce graphics data for image content that is to be displayed and the audio data 21 that is to be played (possibly via integrated speaker 105). The processor 412 may transmit graphics data of the image content to the GPU 414 for further processing based on and instructions or commands that the processor 412 transmits to the GPU 414.

The processor 412 may communicate with the GPU 414 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL®, or the OpenCL™ APIs, and may be extended to other types of APIs. Moreover, the techniques described in this disclosure are not required to function in accordance with an API, and the processor 412 and the GPU 414 may utilize any technique for communication.

The system memory 416 may be the memory for the source device 12. The system memory 416 may comprise one or more computer-readable storage media. Examples of the system memory 416 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 416 may include instructions that cause the processor 412, the GPU 414, and/or the display processor 418 to perform the functions ascribed in this disclosure to the processor 412, the GPU 414, and/or the display processor 418. Accordingly, the system memory 416 may be a computer-readable storage medium having instructions stored thereon that, when executed, cause one or more processors (e.g., the processor 412, the GPU 414, and/or the display processor 418) to perform various functions.

The system memory 416 may include a non-transitory storage medium. The term "non-transitory" indicates that the storage medium is not embodied in a carrier wave or a propagated signal. However, the term "non-transitory" should not be interpreted to mean that the system memory 416 is non-movable or that its contents are static. As one example, the system memory 416 may be removed from the source device 12 and moved to another device. As another example, memory, substantially similar to the system memory 416, may be inserted into the source device 12. In certain examples, a non-transitory storage medium may store data that can, over time, change (e.g., in RAM).

The user interface 420 may represent one or more hardware or virtual (meaning a combination of hardware and software) user interfaces by which a user may interface with the source device 12. The user interface 420 may include physical buttons, switches, toggles, lights or virtual versions thereof. The user interface 420 may also include physical or virtual keyboards, touch interfaces-such as a touchscreen, haptic feedback, and the like.

The processor 412 may include one or more hardware units (including so-called "processing cores") configured to perform all or some portion of the operations discussed above with respect to one or more of the mixing unit 120, the audio encoder 122, the wireless connection manager 128, and the wireless communication units 130. The antenna 421 and the transceiver module 422 may represent a unit configured to establish and maintain the wireless connection between the source device 12 and the sink device 114. The antenna 421 and the transceiver module 422 may represent one or more receivers and/or one or more transmitters capable of wireless communication in accordance with one or more wireless communication protocols. That is, the transceiver module 422 may represent a separate transmitter, a separate receiver, both a separate transmitter and a separate receiver, or a combined transmitter and receiver. The antenna 421 and the transceiver 422 may be configured to receive encoded audio data that has been encoded according to the techniques of this disclosure. Likewise, the antenna 421 and the transceiver 422 may be configured to transmit encoded audio data that has been encoded according to the techniques of this disclosure. The transceiver module 422 may perform all or some portion of the operations of one or more of the wireless connection manager 128 and the wireless communication units 130.

Figure 14:
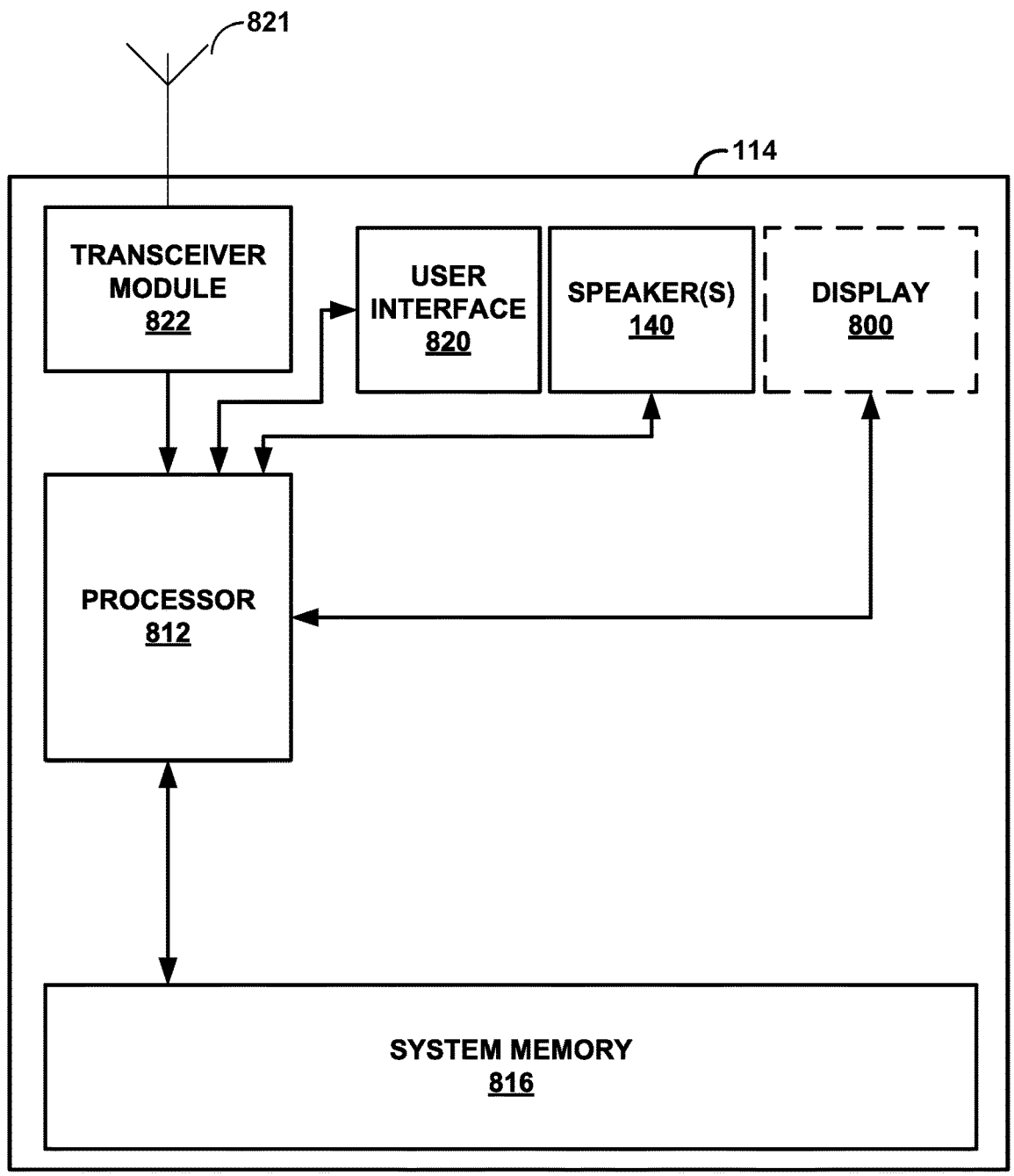
FIG. 14 is a block diagram illustrating exemplary components of the sink device shown in the example of FIG. 2.

FIG. 14 is a block diagram illustrating exemplary components of the sink device shown in the example of FIG. 2. Although the sink device 114 may include components similar to that of the source device 112 discussed above in more detail with respect to the example of FIG. 13, the sink device 14 may, in certain instances, include only a subset of the components discussed above with respect to the source device 112.

In the example of FIG. 14, the sink device 114 includes one or more speakers 802, a processor 812, a system memory 816, a user interface 820, an antenna 821, and a transceiver module 822. The processor 812 may be similar or substantially similar to the processor 812. In some instances, the processor 812 may differ from the processor 412 in terms of total processing capacity or may be tailored for low power consumption. The system memory 816 may be similar or substantially similar to the system memory 416. The speakers 140, the user interface 820, the antenna 821, and the transceiver module 822 may be similar to or substantially similar to the respective speakers 440, user interface 420, and transceiver module 422. The sink device 114 may also optionally include a display 800, although the display 800 may represent a low power, low resolution (potentially a black and white LED) display by which to communicate limited information, which may be driven directly by the processor 812.

The processor 812 may include one or more hardware units (including so-called "processing cores") configured to perform all or some portion of the operations discussed above with respect to one or more of the wireless connection manager 150, the wireless communication units 152, and the audio decoder 132. The antenna 821 and the transceiver module 822 may represent a unit configured to establish and maintain the wireless connection between the source device 112 and the sink device 114. The antenna 821 and the transceiver module 822 may represent one or more receivers and one or more transmitters capable of wireless communication in accordance with one or more wireless communication protocols. The antenna 821 and the transceiver 822 may be configured to receive encoded audio data that has been encoded according to the techniques of this disclosure. Likewise, the antenna 821 and the transceiver 822 may be configured to transmit encoded audio data that has been encoded according to the techniques of this disclosure. The transceiver module 822 may perform all or some portion of the operations of one or more of the wireless connection manager 150 and the wireless communication units 152.

Figure 15:
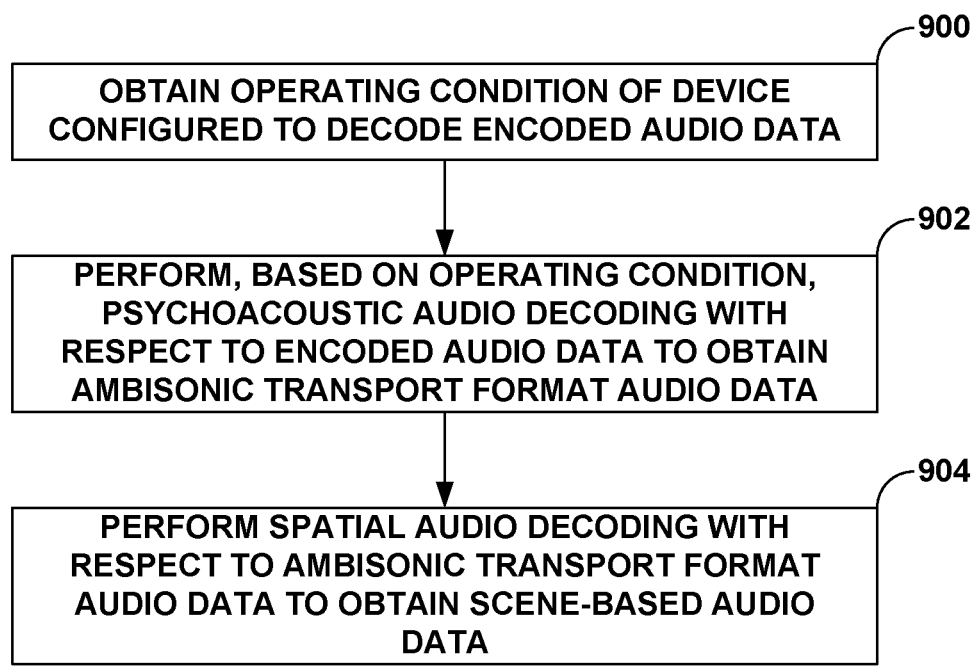
FIG. 15 is a flowchart illustrating example operation of the audio decoder of FIG. 2 in accordance with various aspects of the techniques described in this disclosure.

FIG. 15 is a flowchart illustrating example operation of the audio decoder of FIG. 2 in accordance with various aspects of the techniques described in this disclosure. The audio decoder 132 may first obtain an operating condition of the sink device 114 configured to decode the encoded scene-based audio data (represented as bitstream 131) (900). The audio decoder 132 may next perform, based on the operating condition, psychoacoustic audio decoding with respect to the encoded scene-based audio data 131 to obtain ambisonic transport format audio data 125' (902). The audio decoder 132 may then perform spatial audio decoding with respect to the ambisonic transport format audio data 125' to obtain scene-based audio data 121' (904).

The foregoing aspects of the techniques may enable implementations according to the following clauses.

Clause 1A. A device configured to decode encoded scene-based audio data, the device comprising: a memory configured to store the encoded scene-based audio data; and one or more processors configured to: obtain an operating condition of the device for decoding the encoded scene-based audio data; perform, based on the operating condition, psychoacoustic audio decoding with respect to the encoded scene-based audio data to obtain ambisonic transport format audio data; and perform spatial audio decoding with respect to the ambisonic transport format audio data to obtain scene-based audio data.

Clause 2A. The device of clause 1A, wherein the one or more processors are configured to perform, based on the operating conditions, psychoacoustic audio decoding according to an AptX™ compression algorithm with respect to the encoded scene-based audio data to obtain the ambisonic transport format audio data.

Clause 3A. The device of any combination of clauses 1A and 2A, wherein the one or more processors perform a single instance of a psychoacoustic audio decoding with respect to the encoded scene-based audio data to obtain the ambisonic transport format audio data.

Clause 4A. The device of any combination of clauses 1A-3A, wherein the one or more processors are further configured to obtain a latency requirement for decoding the encoded scene-based audio data; and wherein the one or more processors are configured to perform, based on the operating condition and the latency requirement, the psychoacoustic audio decoding with respect to the encoded scene-based audio data to obtain the ambisonic transport format audio data.

Clause 5A. The device of any combination of clauses 1A-4A, wherein the one or more processors are further configured to establish a communication link over which the encoded scene-based audio data is received, and wherein the one or more processors are configured to obtain a status of the communication link as the operating condition.

Clause 6A. The device of any combination of clauses 1A-5A, wherein the one or more processors are configured to perform, when the operating condition is below a threshold, the psychoacoustic audio decoding with respect to the encoded scene-based audio data to decode a subset of bits representative of the ambisonic transport format audio data, the subset of bits less than a total number of bits used to represent the ambisonic transport format audio data.

Clause 7A. The device of clause 6A, wherein the one or more processors are configured to: determine a number of course bits used during quantization of an energy of the ambisonic transport format audio data; and perform the psychoacoustic audio decoding with respect to the encoded scene-based audio data to decode the number of course bits representative of the ambisonic transport format audio data.

Clause 8A. The device of any combination of clauses 1A-5A, wherein the one or more processors are configured to perform, when the operating condition is greater than or equal to a threshold, the psychoacoustic audio decoding with respect to the encoded scene-based audio data to decode a subset of bits representative of the ambisonic transport format audio data and additional bits representative of the ambisonic transport format audio data, the subset of bits less than a total number of bits used to represent the ambisonic transport format audio data.

Clause 9A. The device of any combination of clauses 1A-5A, wherein the one or more processors are configured to: determine a number of course bits used during quantization of an energy of the ambisonic transport format audio data; determine a number of fine bits used during quantization of the energy of the ambisonic transport format audio data; perform, based on the operating condition is greater than or equal to a threshold, the psychoacoustic audio decoding with respect to the encoded scene-based audio data to decode the number of course bits and the number of fine bits representative of the ambisonic transport format audio data.

Clause 10A. The device of any combination of clauses 6A-9A, wherein the one or more processors are configured to perform the psychoacoustic audio decoding with respect to the encoded scene-based audio data to decode ambisonic audio data corresponding to all of the orders up to a defined order either when reconstructing the subset of bits or both the subset of bits and the additional bits.

Clause 11A. The device of any combination of clauses 1A-5A, wherein the one or more processors are configured to perform, when the operating condition is below a threshold, the psychoacoustic audio decoding with respect to the encoded scene-based audio data to decode ambisonic audio data corresponding to spherical basis functions having a subset of orders, the subset of orders being less than all of the orders of the spherical basis functions to which the ambisonic audio data corresponds.

Clause 12A. The device of any combination of clauses 1A-5A, wherein the one or more processors are configured to perform, when the operating condition is above a threshold, the psychoacoustic audio decoding with respect to the encoded scene-based audio data to reconstruct ambisonic audio data corresponding to spherical basis functions having a subset of orders and at least one additional order, the subset of orders being less than all of the orders of the spherical basis functions to which the ambisonic audio data corresponds.

Clause 13A. The device of any combination of clauses 11A and 12A, wherein the one or more processors are configured to perform the psychoacoustic audio decoding with respect to the encoded scene-based audio data to decode all of the bits representative of the ambisonic audio data corresponding to the spherical basis functions having either the subset of orders or both the subset of orders and the at least one additional order.

Clause 14A. The device of any combination of clauses 1A-13A, wherein the one or more processors are further configured to: render the scene-based audio data to one or more speaker feeds; and output the speaker feeds to one or more speakers to reproduce, based on the speaker feeds, a soundfield represented by the scene-based audio data.

Clause 15A. The device of any combination of clauses 1A-13A, wherein the one or more processors are further configured to render the scene-based audio data to one or more speaker feeds, and wherein the device comprises one or more speakers configured to reproduce, based on the speaker feeds, a soundfield represented by the scene-based audio data.

Clause 16A. The device of any combination of clauses 1A-15A, wherein the one or more processors are configured to obtain a battery power as the operating condition.

Clause 17A. The device of any combination of clauses 1A-16A, wherein the foreground audio signal comprises a foreground ambisonics audio signal.

Clause 18A. A method of decoding encoded scene-based audio data, the method comprising: obtaining an operating condition of a device configured to decode the encoded scene-based audio data; performing, based on the operating condition, psychoacoustic audio decoding with respect to the encoded scene-based audio data to obtain ambisonic transport format audio data; and performing spatial audio decoding with respect to the ambisonic transport format audio data to obtain scene-based audio data.

Clause 19A. The method of clause 18A, wherein performing psychoacoustic audio decoding comprises performing, based on the operating conditions, psychoacoustic audio decoding according to an AptX™ compression algorithm with respect to the encoded scene-based audio data to obtain the ambisonic transport format audio data.

Clause 20A. The method of any combination of clauses 18A and 19A, wherein performing psychoacoustic audio decoding comprises performing a single instance of a psychoacoustic audio decoding with respect to the encoded scene-based audio data to obtain the ambisonic transport format audio data.

Clause 21A. The method of any combination of clauses 18A-20A, further comprising obtaining a latency requirement for decoding the encoded scene-based audio data, and wherein performing the psychoacoustic audio decoding comprises performing, based on the operating condition and the latency requirement, the psychoacoustic audio decoding with respect to the encoded scene-based audio data to obtain the ambisonic transport format audio data.

Clause 22A. The method of any combination of clauses 18A-21A, further comprising establishing a communication link over which the encoded scene-based audio data is received, and wherein obtaining the operating condition comprising obtaining a status of the communication link as the operating condition.

Clause 23A. The method of any combination of clauses 18A-22A, wherein performing the psychoacoustic audio decoding comprises performing, when the operating condition is below a threshold, the psychoacoustic audio decoding with respect to the encoded scene-based audio data to decode a subset of bits representative of the ambisonic transport format audio data, the subset of bits less than a total number of bits used to represent the ambisonic transport format audio data.

Clause 24A. The method of clause 23A, wherein obtaining the psychoacoustic audio decoding comprises: determining a number of course bits used during quantization of an energy of the ambisonic transport format audio data; and performing the psychoacoustic audio decoding with respect to the encoded scene-based audio data to decode the number of course bits representative of the ambisonic transport format audio data.

Clause 25A. The method of any combination of clauses 18A-22A, wherein performing the psychoacoustic audio decoding comprises performing, when the operating condition is greater than or equal to a threshold, the psychoacoustic audio decoding with respect to the encoded scene-based audio data to decode a subset of bits representative of the ambisonic transport format audio data and additional bits representative of the ambisonic transport format audio data, the subset of bits less than a total number of bits used to represent the ambisonic transport format audio data.

Clause 26A. The method of any combination of clauses 18A-22A, where performing the psychoacoustic audio decoding comprises: determining a number of course bits used during quantization of an energy of the ambisonic transport format audio data; determining a number of fine bits used during quantization of the energy of the ambisonic transport format audio data; performing, based on the operating condition is greater than or equal to a threshold, the psychoacoustic audio decoding with respect to the encoded scene-based audio data to decode the number of course bits and the number of fine bits representative of the ambisonic transport format audio data.

Clause 27A. The method of any combination of clauses 23A-26A, wherein performing the psychoacoustic audio decoding comprises performing the psychoacoustic audio decoding with respect to the encoded scene-based audio data to decode ambisonic audio data corresponding to all of the orders up to a defined order either when reconstructing the subset of bits or both the subset of bits and the additional bits.

Clause 28A. The method of any combination of clauses 18A-22A, wherein performing the psychoacoustic audio decoding comprises performing, when the operating condition is below a threshold, the psychoacoustic audio decoding with respect to the encoded scene-based audio data to decode ambisonic audio data corresponding to spherical basis functions having a subset of orders, the subset of orders being less than all of the orders of the spherical basis functions to which the ambisonic audio data corresponds.

Clause 29A. The method of any combination of clauses 18A-22A, wherein performing the psychoacoustic audio decoding comprises performing, when the operating condition is above a threshold, the psychoacoustic audio decoding with respect to the encoded scene-based audio data to reconstruct ambisonic audio data corresponding to spherical basis functions having a subset of orders and at least one additional order, the subset of orders being less than all of the orders of the spherical basis functions to which the ambisonic audio data corresponds.

Clause 30A. The method of any combination of clauses 28A and 29A, wherein performing the psychoacoustic audio decoding comprises performing the psychoacoustic audio decoding with respect to the encoded scene-based audio data to decode all of the bits representative of the ambisonic audio data corresponding to the spherical basis functions having either the subset of orders or both the subset of orders and the at least one additional order.

Clause 31A. The method of any combination of clauses 18A-30A, further comprising: rendering the scene-based audio data to one or more speaker feeds, and outputting the one or more speaker feeds to one or more speakers.

Clause 32A. The method of any combination of clauses 18A-32A, wherein obtaining the operating condition comprises obtaining a battery power as the operating condition.

Clause 33A. The method of any combination of clauses 18A-33A, wherein the foreground audio signal comprises a foreground ambisonics audio signal.

Clause 34A. A device configured to decode encoded scene-based audio data, the device comprising: means for obtaining an operating condition of a device configured to decode the encoded scene-based audio data; means for performing, based on the operating condition, psychoacoustic audio decoding with respect to the encoded scene-based audio data to obtain ambisonic transport format audio data; and means for performing spatial audio decoding with respect to the ambisonic transport format audio data to obtain scene-based audio data.

Clause 35A. The device of clause 34A, wherein the means for performing psychoacoustic audio decoding comprises means for performing, based on the operating conditions, psychoacoustic audio decoding according to an AptX™ compression algorithm with respect to the encoded scene-based audio data to obtain the ambisonic transport format audio data.

Clause 36A. The device of any combination of clauses 34A and 35A, wherein the means for performing psychoacoustic audio decoding comprises means for performing a single instance of a psychoacoustic audio decoding with respect to the encoded scene-based audio data to obtain the ambisonic transport format audio data.

Clause 37A. The device of any combination of clauses 34A-36A, further comprising means for obtaining a latency requirement for decoding the encoded scene-based audio data, and wherein the means for performing the psychoacoustic audio decoding comprises means for performing, based on the operating condition and the latency requirement, the psychoacoustic audio decoding with respect to the encoded scene-based audio data to obtain the ambisonic transport format audio data.

Clause 38A. The device of any combination of clauses 34A-37A, further comprising means for establishing a communication link over which the encoded scene-based audio data is received, and wherein the means for obtaining the operating condition comprising means for obtaining a status of the communication link as the operating condition.

Clause 39A. The device of any combination of clauses 34A-38A, wherein the means for performing the psychoacoustic audio decoding comprises means for performing, when the operating condition is below a threshold, the psychoacoustic audio decoding with respect to the encoded scene-based audio data to decode a subset of bits representative of the ambisonic transport format audio data, the subset of bits less than a total number of bits used to represent the ambisonic transport format audio data.

Clause 40A. The device of clause 39A, wherein the means for obtaining the psychoacoustic audio decoding comprises: means for determining a number of course bits used during quantization of an energy of the ambisonic transport format audio data; and means for performing the psychoacoustic audio decoding with respect to the encoded scene-based audio data to decode the number of course bits representative of the ambisonic transport format audio data.

Clause 41A. The device of any combination of clauses 34A-38A, wherein the means for performing the psychoacoustic audio decoding comprises means for performing, when the operating condition is greater than or equal to a threshold, the psychoacoustic audio decoding with respect to the encoded scene-based audio data to decode a subset of bits representative of the ambisonic transport format audio data and additional bits representative of the ambisonic transport format audio data, the subset of bits less than a total number of bits used to represent the ambisonic transport format audio data.

Clause 42A. The device of any combination of clauses 34A-38A, where the means for performing the psychoacoustic audio decoding comprises: means for determining a number of course bits used during quantization of an energy of the ambisonic transport format audio data; means for determining a number of fine bits used during quantization of the energy of the ambisonic transport format audio data; means for performing, based on the operating condition is greater than or equal to a threshold, the psychoacoustic audio decoding with respect to the encoded scene-based audio data to decode the number of course bits and the number of fine bits representative of the ambisonic transport format audio data.

Clause 43A. The device of any combination of clauses 39A-42A, wherein the means for performing the psychoacoustic audio decoding comprises means for performing the psychoacoustic audio decoding with respect to the encoded scene-based audio data to decode ambisonic audio data corresponding to all of the orders up to a defined order either when reconstructing the subset of bits or both the subset of bits and the additional bits.

Clause 44A. The device of any combination of clauses 34A-38A, wherein the means for performing the psychoacoustic audio decoding comprises means for performing, when the operating condition is below a threshold, the psychoacoustic audio decoding with respect to the encoded scene-based audio data to decode ambisonic audio data corresponding to spherical basis functions having a subset of orders, the subset of orders being less than all of the orders of the spherical basis functions to which the ambisonic audio data corresponds.

Clause 45A. The device of any combination of clauses 34A-38A, wherein the means for performing the psychoacoustic audio decoding comprises means for performing, when the operating condition is above a threshold, the psychoacoustic audio decoding with respect to the encoded scene-based audio data to reconstruct ambisonic audio data corresponding to spherical basis functions having a subset of orders and at least one additional order, the subset of orders being less than all of the orders of the spherical basis functions to which the ambisonic audio data corresponds.

Clause 46A. The device of any combination of clauses 44A and 45A, wherein the means for performing the psychoacoustic audio decoding comprises means for performing the psychoacoustic audio decoding with respect to the encoded scene-based audio data to decode all of the bits representative of the ambisonic audio data corresponding to the spherical basis functions having either the subset of orders or both the subset of orders and the at least one additional order.

Clause 47A. The device of any combination of clauses 34A-46A, further comprising: means for rendering the scene-based audio data to one or more speaker feeds, and means for outputting the one or more speaker feeds to one or more speakers.

Clause 48A. The device of any combination of clauses 34A-48A, wherein the means for obtaining the operating condition comprises means for obtaining a battery power as the operating condition.

Clause 49A. The device of any combination of clauses 34A-49A, wherein the foreground audio signal comprises a foreground ambisonics audio signal.

Clause 50A. A non-transitory computer-readable storage medium having stored thereon instructions that, when executed, cause one or more processors to: obtain an operating condition of the device configured to decode encoded scene-based audio data; perform, based on the operating condition, psychoacoustic audio decoding with respect to the encoded scene-based audio data to obtain ambisonic transport format audio data; and perform spatial audio decoding with respect to the ambisonic transport format audio data to obtain scene-based audio data.

In some contexts, such as broadcasting contexts, the audio encoding device may be split into a spatial audio encoder, which performs a form of intermediate compression with respect to the ambisonic representation that includes gain control, and a psychoacoustic audio encoder 26 (which may also be referred to as a "perceptual audio encoder 26") that performs perceptual audio compression to reduce redundancies in data between the gain normalized transport channels.

In addition, the foregoing techniques may be performed with respect to any number of different contexts and audio ecosystems and should not be limited to any of the contexts or audio ecosystems described above. A number of example contexts are described below, although the techniques should be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based one or more codecs (e.g., AAC, AC3, Dolby True HD®, Dolby Digital Plus®, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed comprises an audio ecosystem that may include broadcast recording audio objects, professional audio systems, consumer on-device capture, ambisonic audio format, on-device rendering, consumer audio, TV, and accessories, and car audio systems.

The broadcast recording audio objects, the professional audio systems, and the consumer on-device capture may all code their output using ambisonic audio format. In this way, the audio content may be coded using the ambisonic audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.), such as audio playback system 16.

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a soundfield. For instance, the mobile device may acquire a soundfield via the wired and/or wireless acquisition devices and/or the on-device surround sound capture (e.g., a plurality of microphones integrated into the mobile device). The mobile device may then code the acquired soundfield into the ambisonic coefficients for playback by one or more of the playback elements. For instance, a user of the mobile device may record (acquire a soundfield of) a live event (e.g., a meeting, a conference, a play, a concert, etc.), and code the recording into ambisonic coefficients.

The mobile device may also utilize one or more of the playback elements to playback the ambisonic coded soundfield. For instance, the mobile device may decode the ambisonic coded soundfield and output a signal to one or more of the playback elements that causes the one or more of the playback elements to recreate the soundfield. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D soundfield and playback the same 3D soundfield at a later time. In some examples, the mobile device may acquire a 3D soundfield, encode the 3D soundfield into HOA, and transmit the encoded 3D soundfield to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of ambisonic signals. For instance, the one or more DAWs may include ambisonic plugins and/or tools which may be configured to operate with (e.g., work with) one or more game audio systems. In some examples, the game studios may output new stem formats that support HOA. In any case, the game studios may output coded audio content to the rendering engines which may render a soundfield for playback by the delivery systems.

The techniques may also be performed with respect to exemplary audio acquisition devices. For example, the techniques may be performed with respect to an Eigen microphone which may include a plurality of microphones that are collectively configured to record a 3D soundfield. In some examples, the plurality of microphones of Eigen microphone may be located on the surface of a substantially spherical ball with a radius of approximately 4 cm. In some examples, the audio encoding device 20 may be integrated into the Eigen microphone so as to output a bitstream 21 directly from the microphone.

Another exemplary audio acquisition context may include a production truck which may be configured to receive a signal from one or more microphones, such as one or more Eigen microphones. The production truck may also include an audio encoder, such as the spatial audio encoding device 24 of FIG. 1.

The mobile device may also, in some instances, include a plurality of microphones that are collectively configured to record a 3D soundfield. In other words, the plurality of microphone may have X, Y, Z diversity. In some examples, the mobile device may include a microphone which may be rotated to provide X, Y, Z diversity with respect to one or more other microphones of the mobile device. The mobile device may also include an audio encoder, such as the audio encoder 22 of FIG. 1.

A ruggedized video capture device may further be configured to record a 3D soundfield. In some examples, the ruggedized video capture device may be attached to a helmet of a user engaged in an activity. For instance, the ruggedized video capture device may be attached to a helmet of a user whitewater rafting. In this way, the ruggedized video capture device may capture a 3D soundfield that represents the action all around the user (e.g., water crashing behind the user, another rafter speaking in front of the user, etc . . . ).

The techniques may also be performed with respect to an accessory enhanced mobile device, which may be configured to record a 3D soundfield. In some examples, the mobile device may be similar to the mobile devices discussed above, with the addition of one or more accessories. For instance, an Eigen microphone may be attached to the above noted mobile device to form an accessory enhanced mobile device. In this way, the accessory enhanced mobile device may capture a higher quality version of the 3D soundfield than just using sound capture components integral to the accessory enhanced mobile device.

Example audio playback devices that may perform various aspects of the techniques described in this disclosure are further discussed below. In accordance with one or more techniques of this disclosure, speakers and/or sound bars may be arranged in any arbitrary configuration while still playing back a 3D soundfield. Moreover, in some examples, headphone playback devices may be coupled to a decoder 32 (which is another way to refer to the audio decoding device

32 of FIG. 1) via either a wired or a wireless connection. In accordance with one or more techniques of this disclosure, a single generic representation of a soundfield may be utilized to render the soundfield on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front speakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a soundfield may be utilized to render the soundfield on any of the foregoing playback environments. Additionally, the techniques of this disclosure enable a rendered to render a soundfield from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the 3D soundfield of the sports game may be acquired (e.g., one or more Eigen microphones may be placed in and/or around the baseball stadium), ambisonic coefficients corresponding to the 3D soundfield may be obtained and transmitted to a decoder, the decoder may reconstruct the 3D soundfield based on the ambisonic coefficients and output the reconstructed 3D soundfield to a renderer, the renderer may obtain an indication as to the type of playback environment (e.g., headphones), and render the reconstructed 3D soundfield into signals that cause the headphones to output a representation of the 3D soundfield of the sports game.

In each of the various instances described above, it should be understood that the audio encoding device 22 may perform a method or otherwise comprise means to perform each step of the method for which the audio encoding device 22 is configured to perform In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio encoding device 20 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, as used herein, "A and/or B" means "A or B", or both "A and B."

Various aspects of the techniques have been described. These and other aspects of the techniques are within the scope of the following claims.

The invention claimed is:

1. A device configured to decode encoded scene-based audio data, the device comprising:
   a memory configured to store the encoded scene-based audio data; and
   one or more processors configured to:
   monitor one or more internal components of the device to obtain an operating condition of the device for decoding the encoded scene-based audio data;
   perform, based on the operating condition, psychoacoustic audio decoding with respect to the encoded scene-based audio data to obtain ambisonic transport format audio data; and perform spatial audio decoding with respect to the ambisonic transport format audio data to obtain scene-based audio data.

2. The device of claim 1, wherein the one or more processors perform a single instance of the psychoacoustic audio decoding with respect to the encoded scene-based audio data to obtain the ambisonic transport format audio data.

3. The device of claim 1, wherein the one or more processors are configured to perform, based on the operating conditions, psychoacoustic audio decoding according to a compression algorithm with respect to the encoded scene-based audio data to obtain the ambisonic transport format audio data.

4. The device of claim 1,
wherein the one or more processors are further configured to obtain a latency requirement for decoding the encoded scene-based audio data; and
wherein the one or more processors are configured to perform, based on the operating condition and the latency requirement, the psychoacoustic audio decoding with respect to the encoded scene-based audio data to obtain the ambisonic transport format audio data.

5. The device of claim 1,
wherein the one or more processors are further configured to establish a communication link over which the encoded scene-based audio data is received, and
wherein the one or more processors are configured to monitor an internal communication component that established the communication link to obtain a status of the communication link as the operating condition.

6. The device of claim 1, wherein the one or more processors are configured to perform, when the operating condition is below a threshold, the psychoacoustic audio decoding with respect to the encoded scene-based audio data to decode a subset of bits representative of the ambisonic transport format audio data, the subset of bits less than a total number of bits used to represent the ambisonic transport format audio data.

7. The device of claim 6, wherein the one or more processors are configured to:
determine a number of course bits used during quantization of an energy of the ambisonic transport format audio data; and
perform the psychoacoustic audio decoding with respect to the encoded scene-based audio data to decode the number of course bits representative of the ambisonic transport format audio data.

8. The device of claim 1, wherein the one or more processors are configured to perform, when the operating condition is greater than or equal to a threshold, the psychoacoustic audio decoding with respect to the encoded scene-based audio data to decode a subset of bits representative of the ambisonic transport format audio data and additional bits representative of the ambisonic transport format audio data, the subset of bits less than a total number of bits used to represent the ambisonic transport format audio data.

9. The device of claim 8, wherein the one or more processors are configured to perform the psychoacoustic audio decoding with respect to the encoded scene-based audio data to decode the ambisonic transport format audio data corresponding to all of the orders up to a defined order either when reconstructing the subset of bits or both the subset of bits and the additional bits.

10. The device of claim 1, wherein the one or more processors are configured to:
determine a number of course bits used during quantization of an energy of the ambisonic transport format audio data;
determine a number of fine bits used during quantization of the energy of the ambisonic transport format audio data; and
perform, when the operating condition is greater than or equal to a threshold, the psychoacoustic audio decoding with respect to the encoded scene-based audio data to decode the number of course bits and the number of fine bits representative of the ambisonic transport format audio data.

11. The device of claim 1, wherein the one or more processors are configured to perform, when the operating condition is below a threshold, the psychoacoustic audio decoding with respect to the encoded scene-based audio data to decode the ambisonic transport format audio data corresponding to spherical basis functions having a subset of orders, the subset of orders being less than all of the orders of the spherical basis functions to which the scene-based audio data corresponds.

12. The device of claim 1, wherein the one or more processors are configured to perform, when the operating condition is above a threshold, the psychoacoustic audio decoding with respect to the encoded scene-based audio data to reconstruct the ambisonic transport format audio data corresponding to spherical basis functions having a subset of orders and at least one additional order, the subset of orders being less than all of the orders of the spherical basis functions to which the scene-based audio data corresponds.

13. The device of claim 12, wherein the one or more processors are configured to perform the psychoacoustic audio decoding with respect to the encoded scene-based audio data to decode all of the bits representative of the ambisonic transport format audio data corresponding to the spherical basis functions having either the subset of orders or both the subset of orders and the at least one additional order.

14. The device of claim 1, wherein the one or more processors are further configured to:
render the scene-based audio data to one or more speaker feeds; and
output the speaker feeds to one or more speakers to reproduce, based on the speaker feeds, a soundfield represented by the scene-based audio data.

15. The device of claim 1,
wherein the one or more processors are further configured to render the scene-based audio data to one or more speaker feeds, and
wherein the device comprises one or more speakers configured to reproduce, based on the speaker feeds, a soundfield represented by the scene-based audio data.

16. The device of claim 1, wherein the one or more processors are configured to monitor an internal battery of the device to obtain a battery power as the operating condition.

17. A method of decoding encoded scene-based audio data, the method comprising:
monitoring one or more internal components of a device configured to decode the scene-based audio data to obtain an operating condition of the device;
performing, based on the operating condition, psychoacoustic audio decoding with respect to the encoded scene-based audio data to obtain ambisonic transport format audio data; and performing spatial audio decoding with respect to the ambisonic transport format audio data to obtain scene-based audio data.

18. The method of claim 17, wherein performing the psychoacoustic audio decoding comprises performing a single instance of the psychoacoustic audio decoding with respect to the encoded scene-based audio data to obtain the ambisonic transport format audio data.

19. The method of claim 17, wherein performing the psychoacoustic audio decoding comprises performing, based on the operating conditions, the psychoacoustic audio decoding according to a compression algorithm with respect to the encoded scene-based audio data to obtain the ambisonic transport format audio data.

20. The method of claim 17, further comprising obtaining a latency requirement for decoding the encoded scene-based audio data, and
wherein performing the psychoacoustic audio decoding comprises performing, based on the operating condition and the latency requirement, the psychoacoustic audio decoding with respect to the encoded scene-based audio data to obtain the ambisonic transport format audio data.

21. The method of claim 17, further comprising establishing a communication link over which the encoded scene-based audio data is received, and
wherein monitoring the one or more internal components includes monitoring a communication unit that established the communication link to obtain a status of the communication link as the operating condition.

22. The method of claim 17, wherein performing the psychoacoustic audio decoding comprises performing, when the operating condition is below a threshold, the psychoacoustic audio decoding with respect to the encoded scene-based audio data to decode a subset of bits representative of the ambisonic transport format audio data, the subset of bits less than a total number of bits used to represent the ambisonic transport format audio data.

23. The method of claim 22, wherein obtaining the psychoacoustic audio decoding comprises:
determining a number of course bits used during quantization of an energy of the ambisonic transport format audio data; and
performing the psychoacoustic audio decoding with respect to the encoded scene-based audio data to decode the number of course bits representative of the ambisonic transport format audio data.

24. The method of claim 17, wherein performing the psychoacoustic audio decoding comprises performing, when the operating condition is greater than or equal to a threshold, the psychoacoustic audio decoding with respect to the encoded scene-based audio data to decode a subset of bits representative of the ambisonic transport format audio data and additional bits representative of the ambisonic transport format audio data, the subset of bits less than a total number of bits used to represent the ambisonic transport format audio data.

25. The method of claim 17, where performing the psychoacoustic audio decoding comprises:
determining a number of course bits used during quantization of an energy of the ambisonic transport format audio data;
determining a number of fine bits used during quantization of the energy of the ambisonic transport format audio data; and
performing, based on the operating condition is greater than or equal to a threshold, the psychoacoustic audio decoding with respect to the encoded scene-based audio data to decode the number of course bits and the number of fine bits representative of the ambisonic transport format audio data.

26. The method of claim 22, wherein performing the psychoacoustic audio decoding comprises performing the psychoacoustic audio decoding with respect to the encoded scene-based audio data to decode the ambisonic transport format audio data corresponding to all of the orders up to a defined order either when reconstructing the subset of bits or both the subset of bits and additional bits.

27. The method of claim 17, wherein performing the psychoacoustic audio decoding comprises performing, when the operating condition is below a threshold, the psychoacoustic audio decoding with respect to the encoded scene-based audio data to decode the ambisonic transport format audio data corresponding to spherical basis functions having a subset of orders, the subset of orders being less than all of the orders of the spherical basis functions to which the scene-based audio data corresponds.

28. A device configured to decode encoded scene-based audio data, the device comprising:
means for monitoring one or more internal components of the device to obtain an operating condition of the device;
means for performing, based on the operating condition, psychoacoustic audio decoding with respect to the encoded scene-based audio data to obtain ambisonic transport format audio data; and
means for performing spatial audio decoding with respect to the ambisonic transport format audio data to obtain scene-based audio data.

29. A non-transitory computer-readable storage medium having stored thereon instructions that, when executed, cause one or more processors of a device configured to decode encoded scene-based audio data to:
monitor one or more internal components of the device to obtain an operating condition of the device;
perform, based on the operating condition, psychoacoustic audio decoding with respect to the encoded scene-based audio data to obtain ambisonic transport format audio data; and
perform spatial audio decoding with respect to the ambisonic transport format audio data to obtain scene-based audio data.

* * * * *